United States Patent Office 3,495,064
Patented Feb. 10, 1970

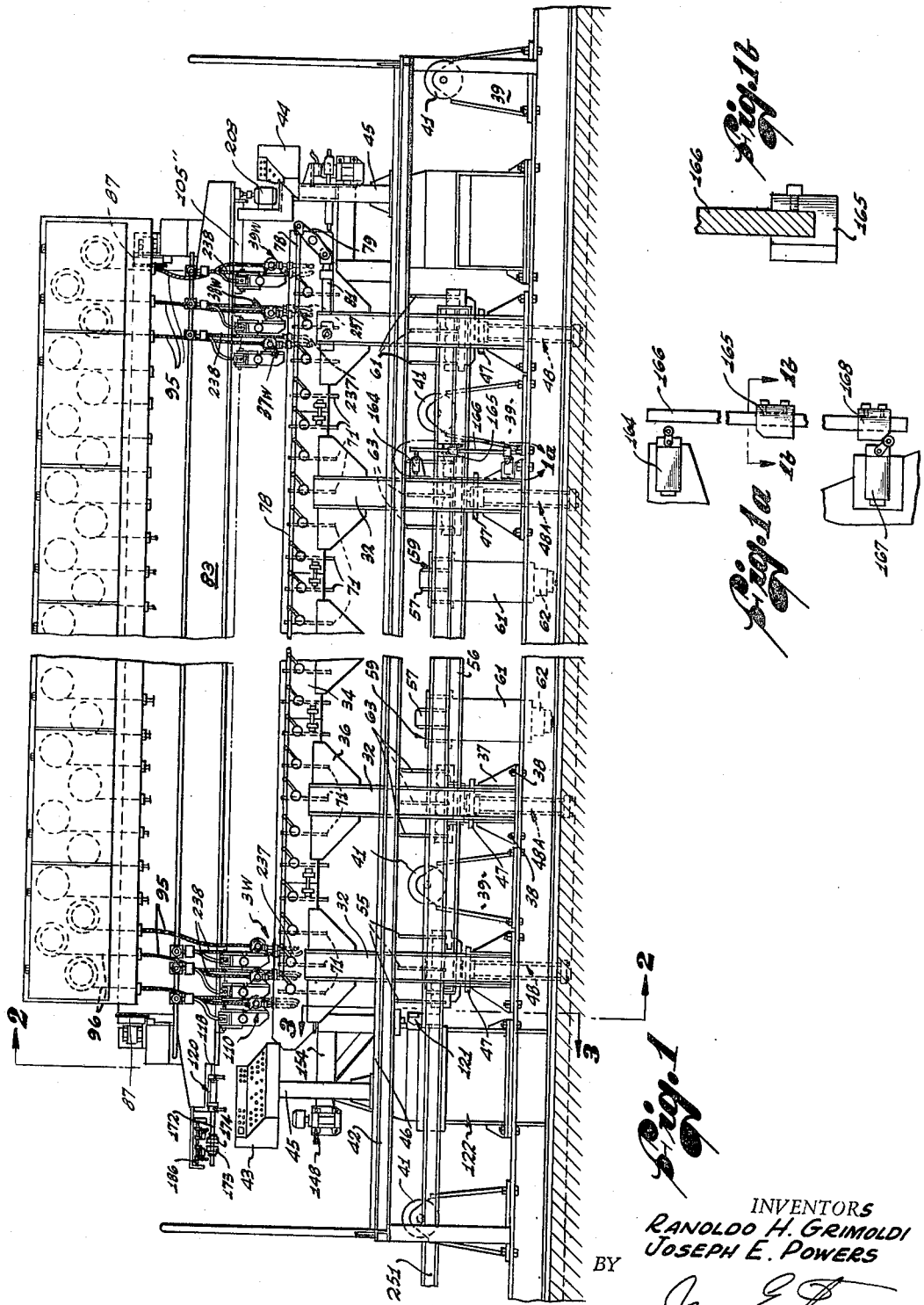

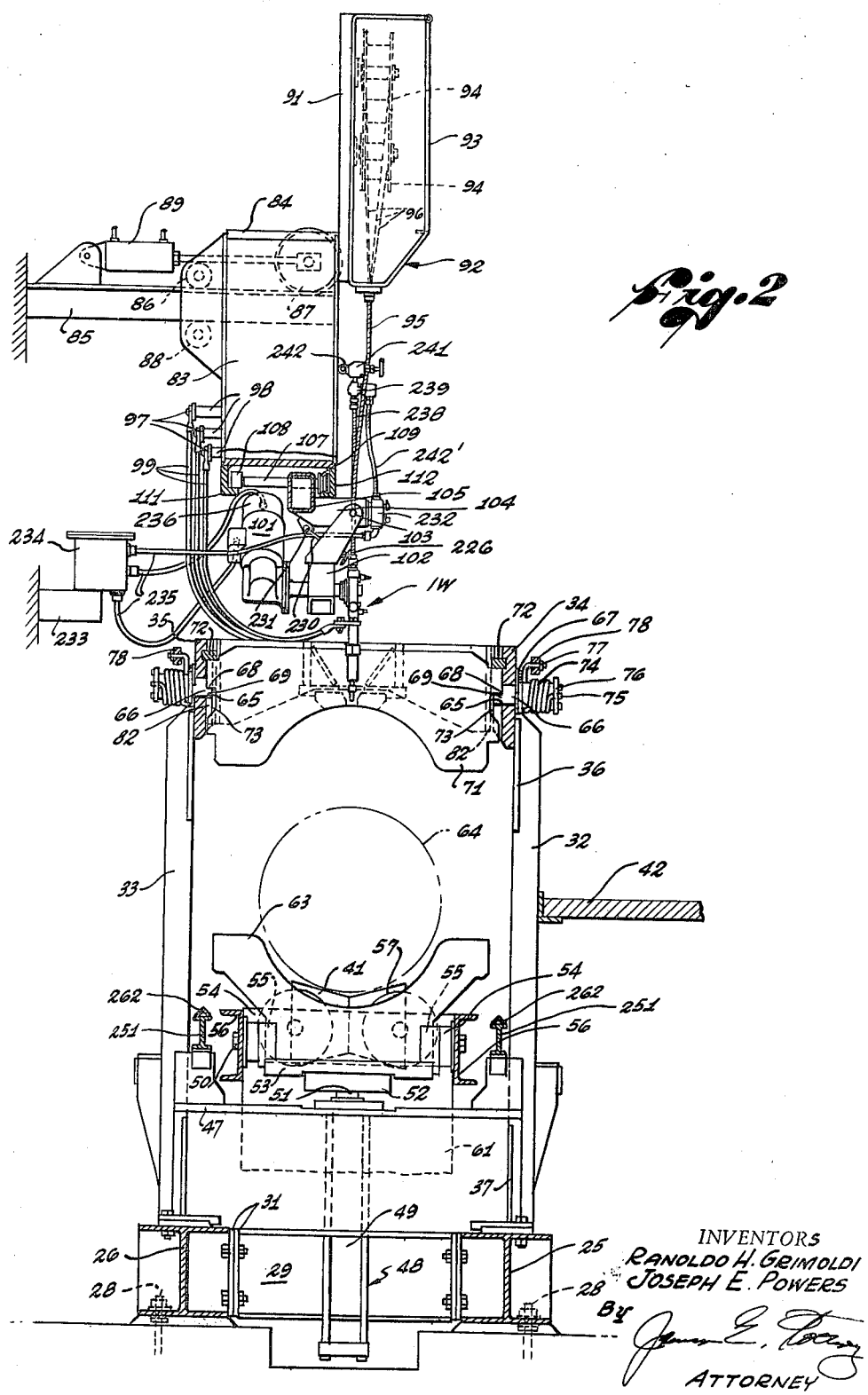

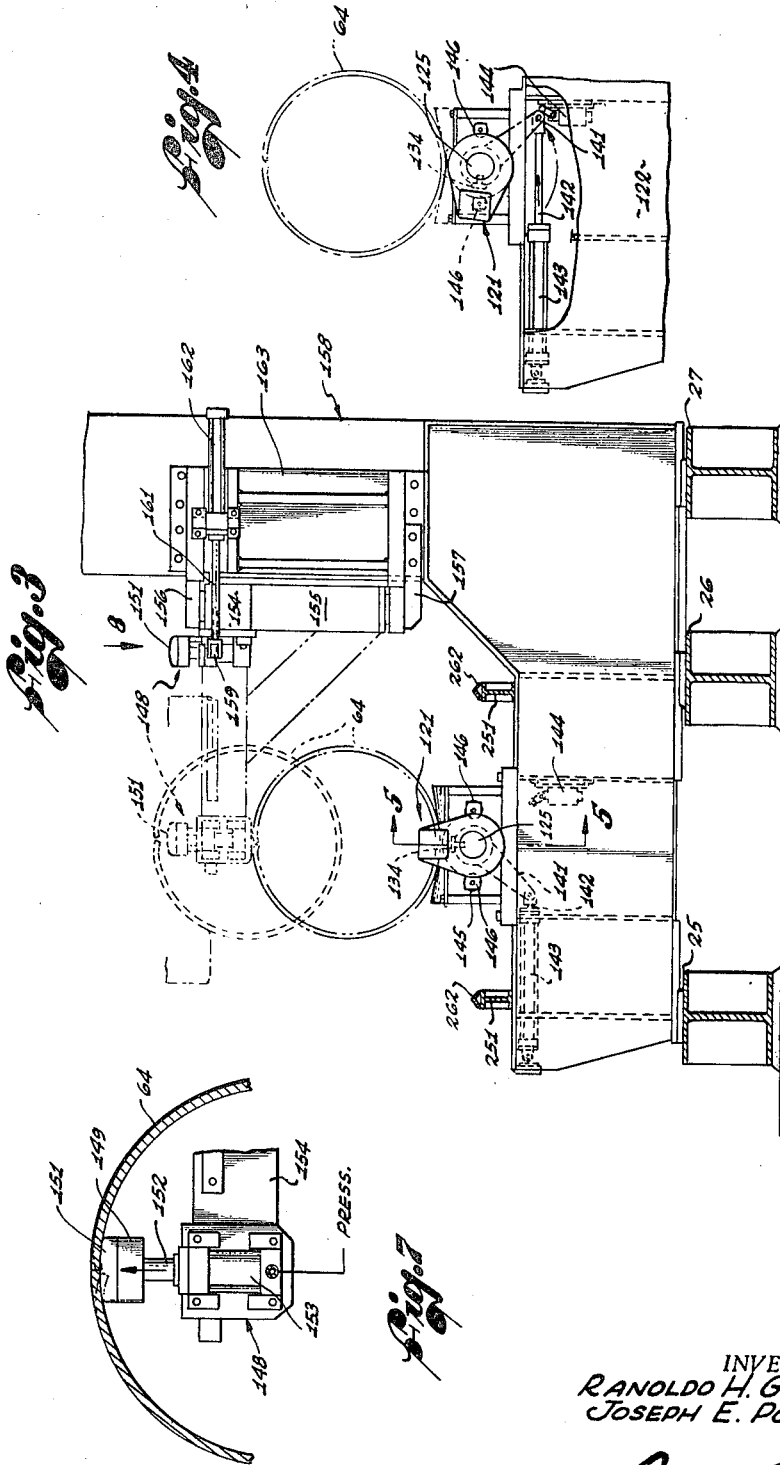

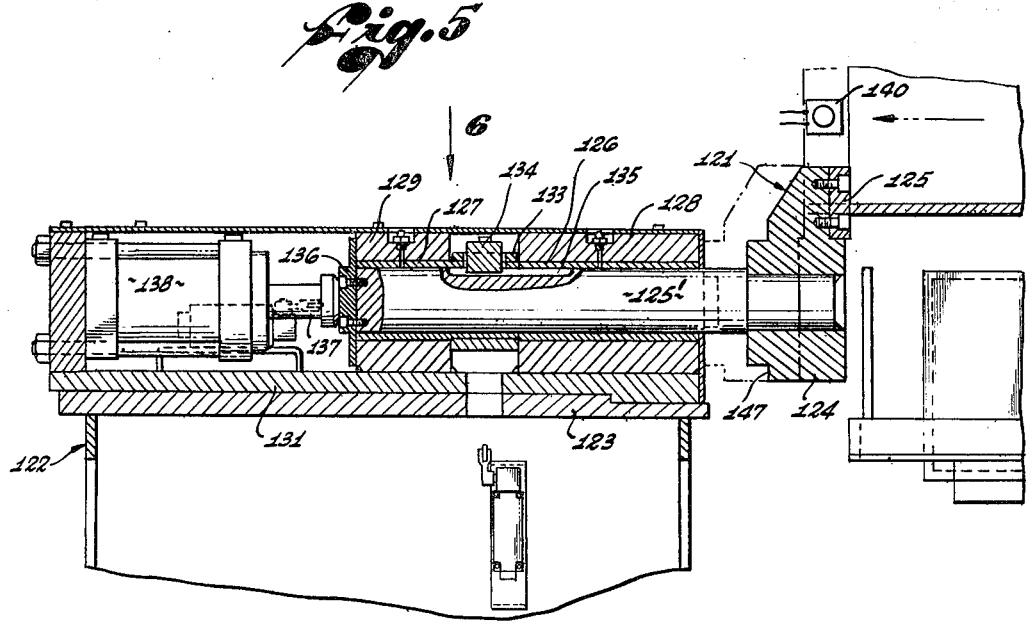
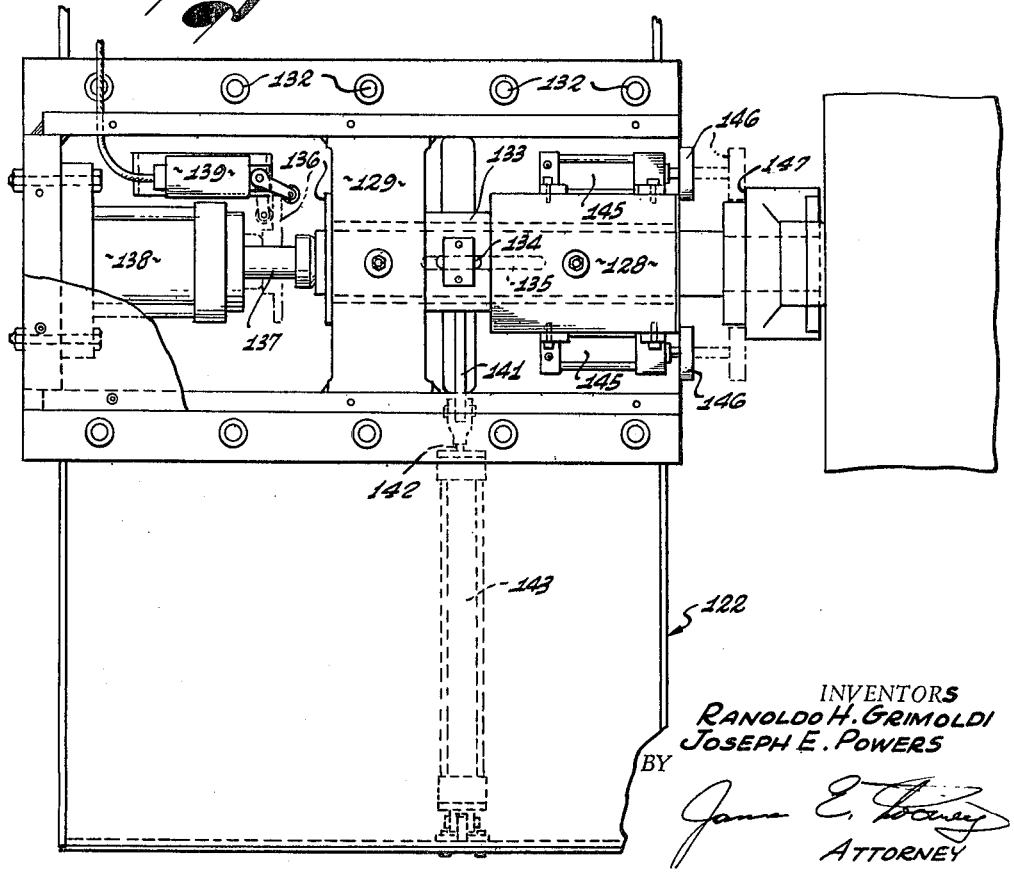

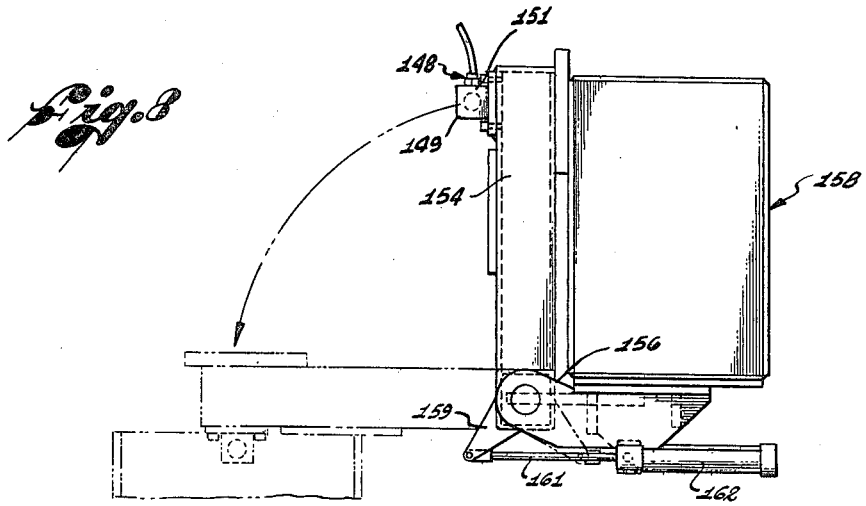
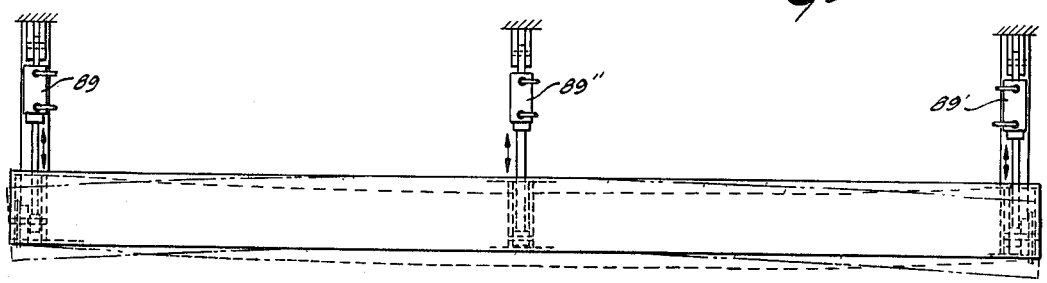
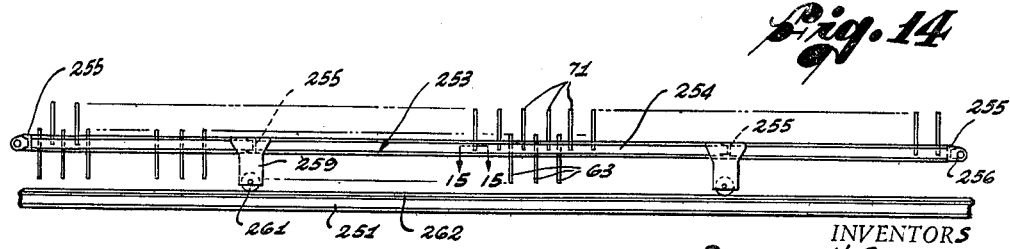

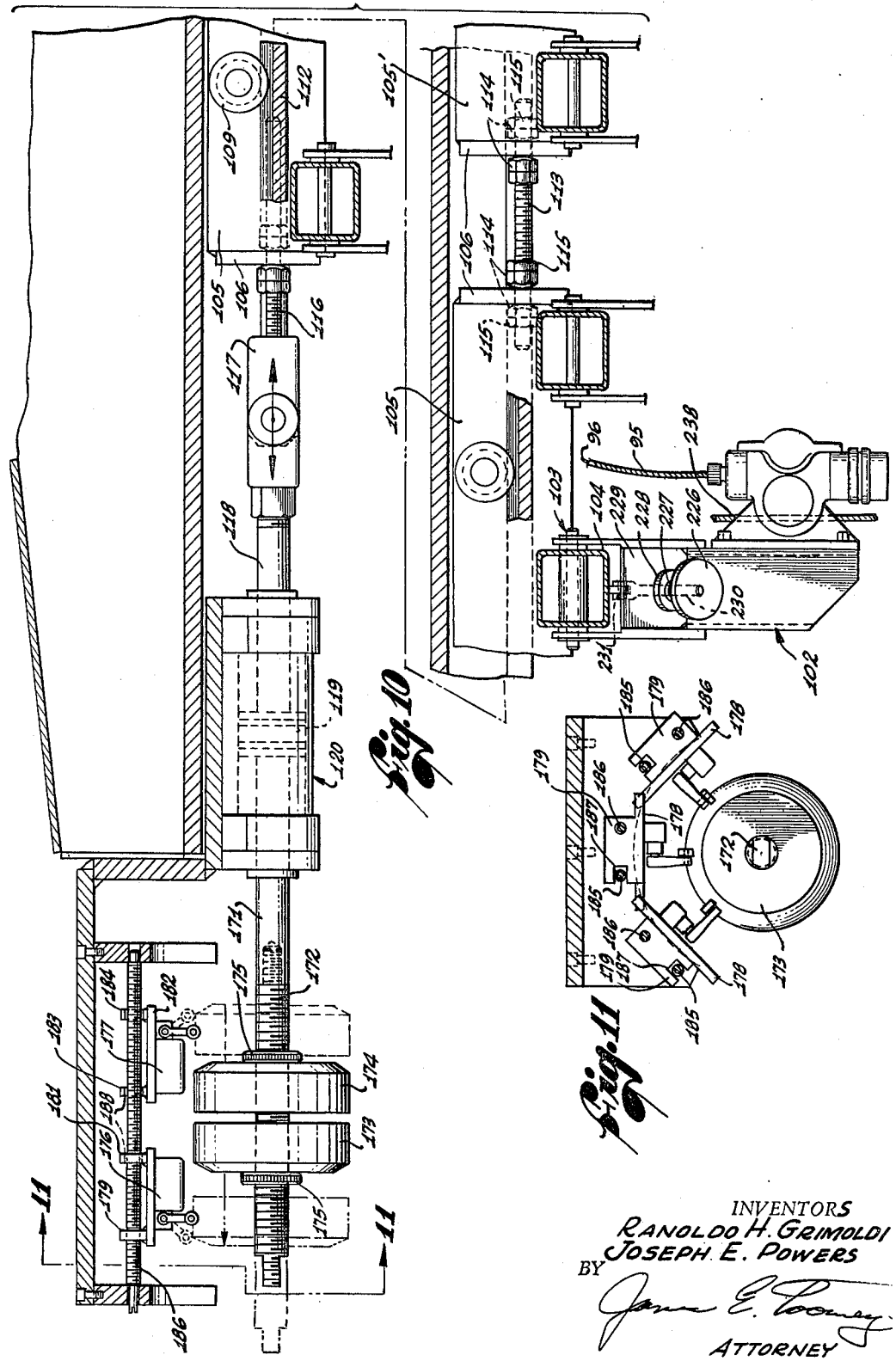

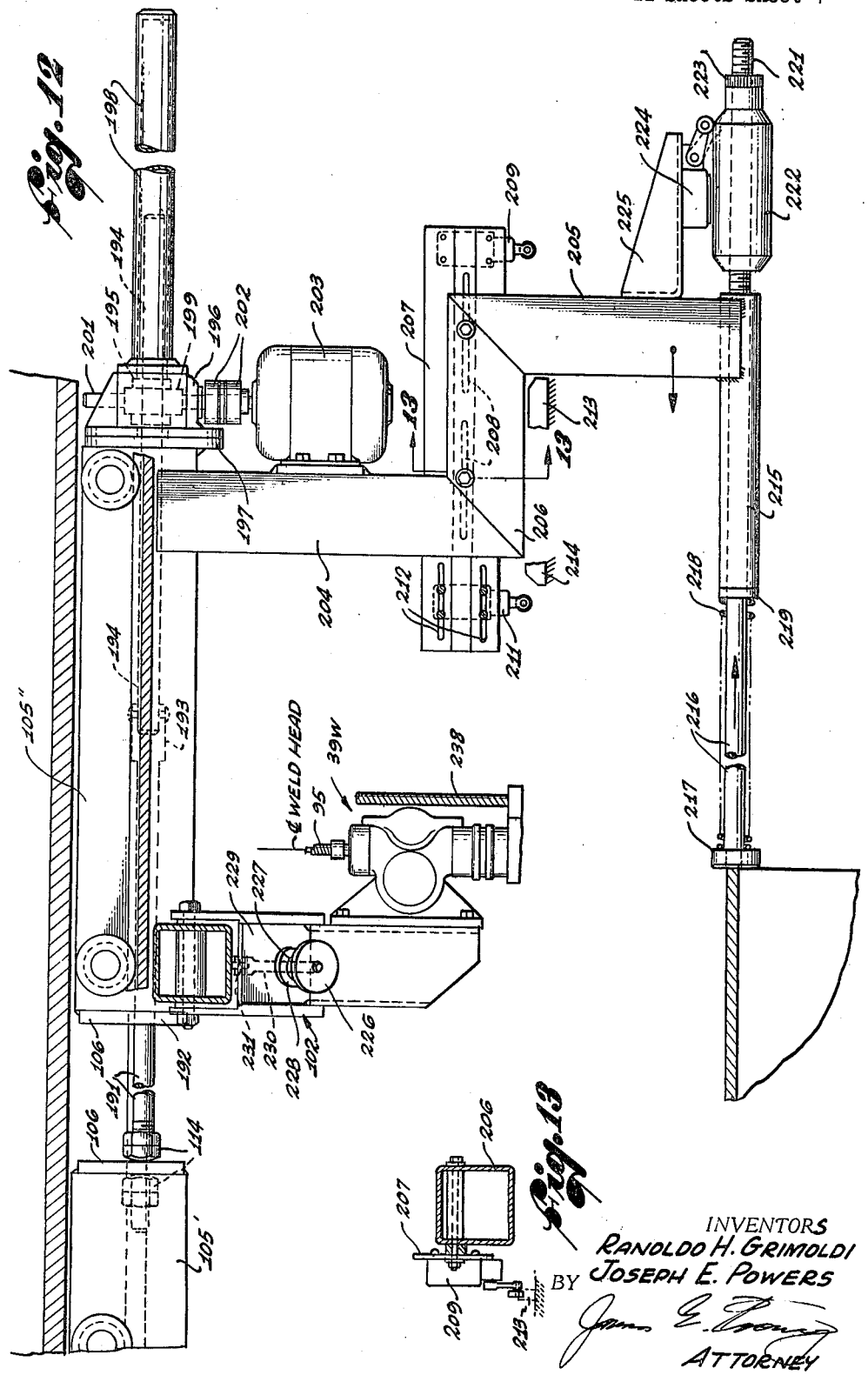

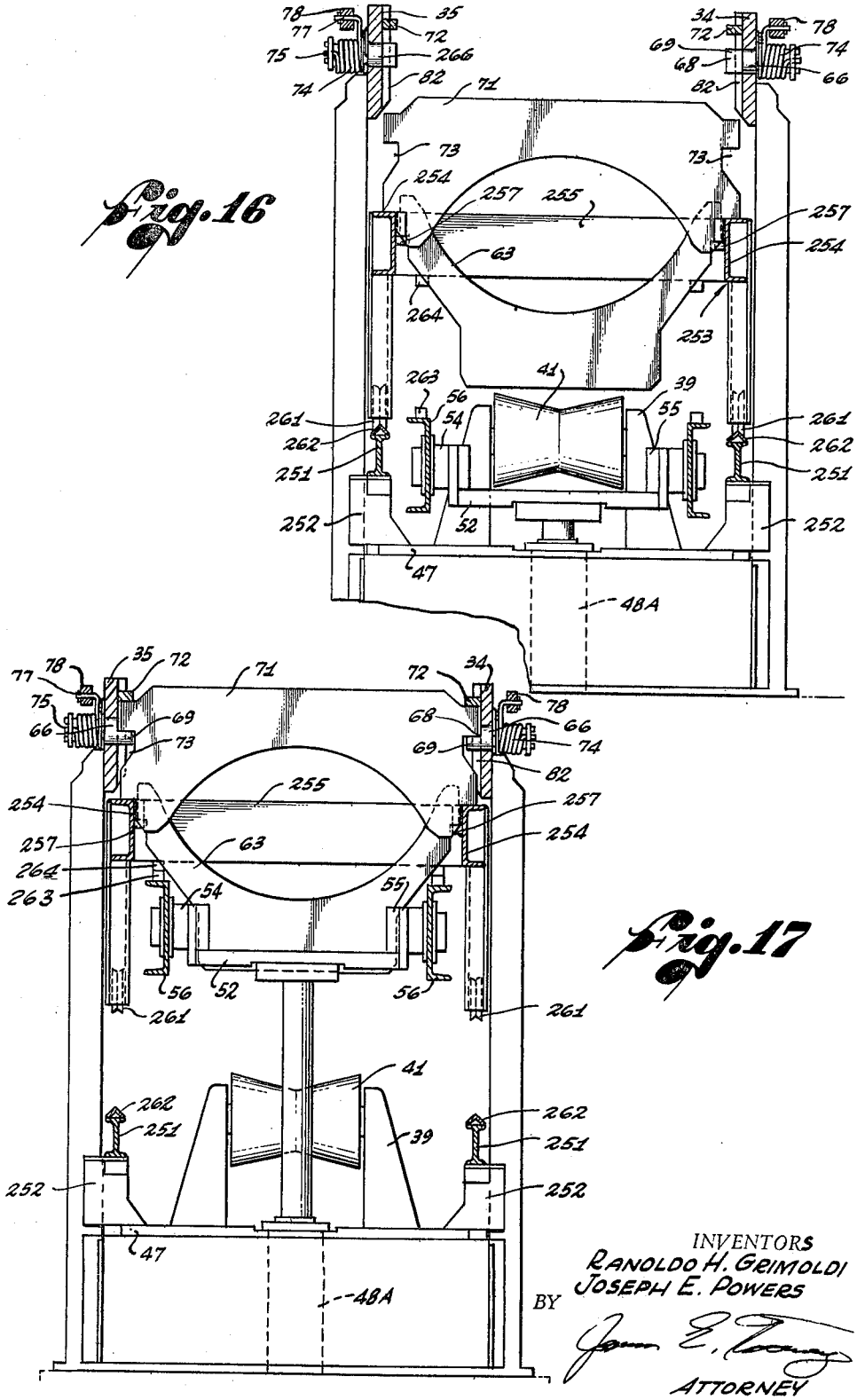

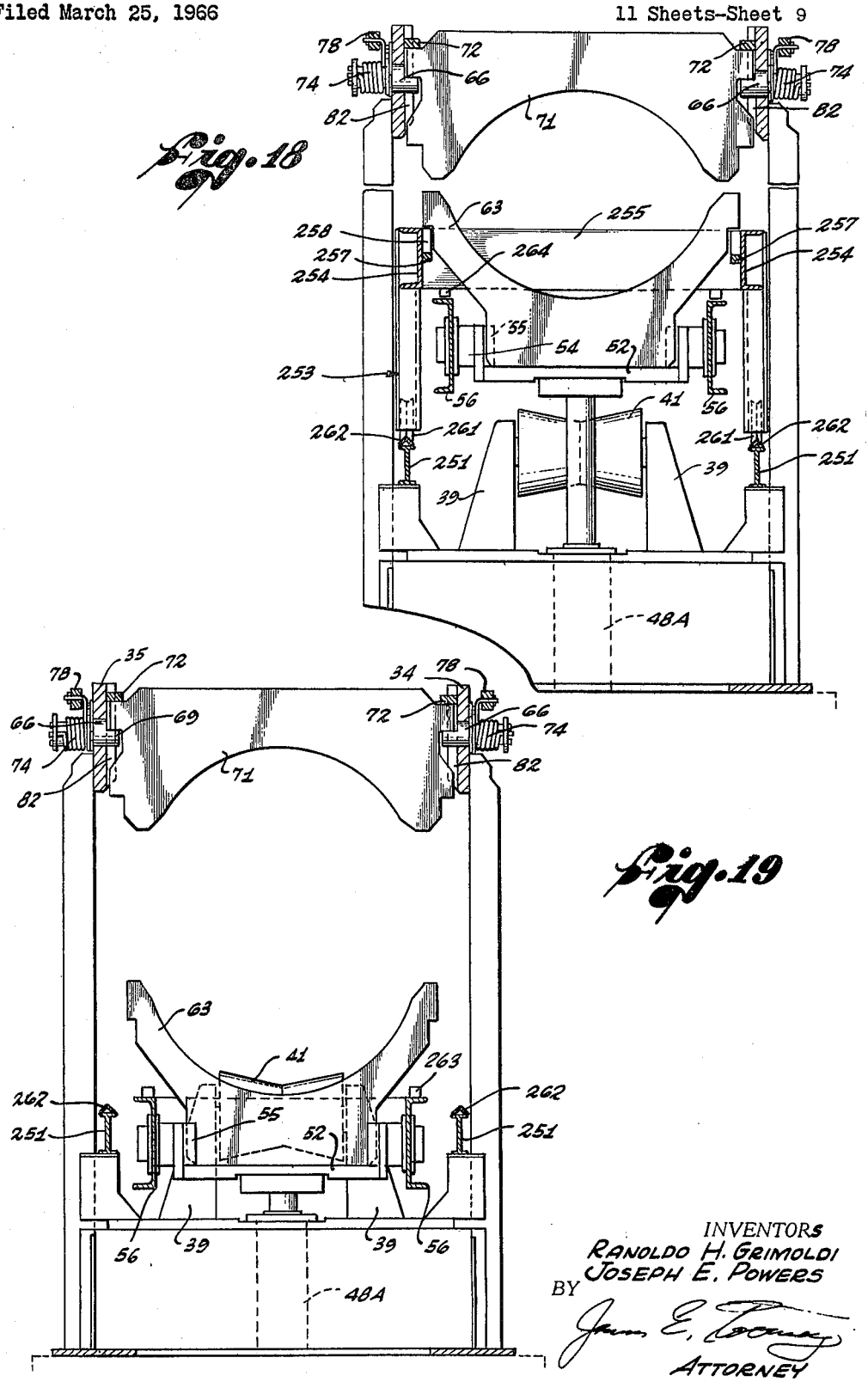

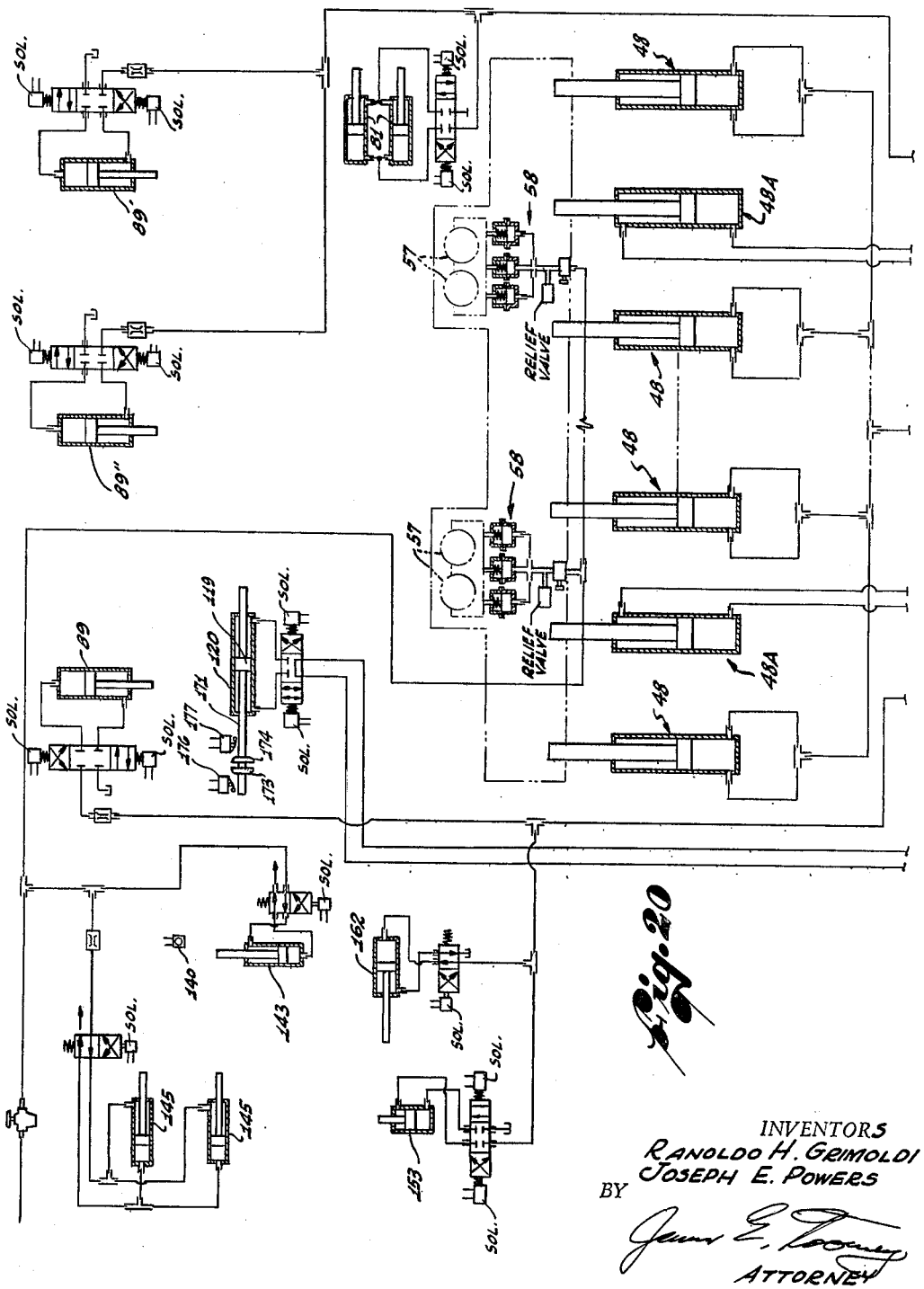

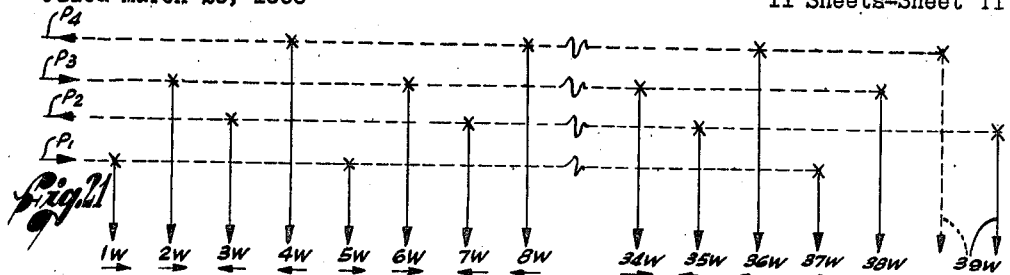
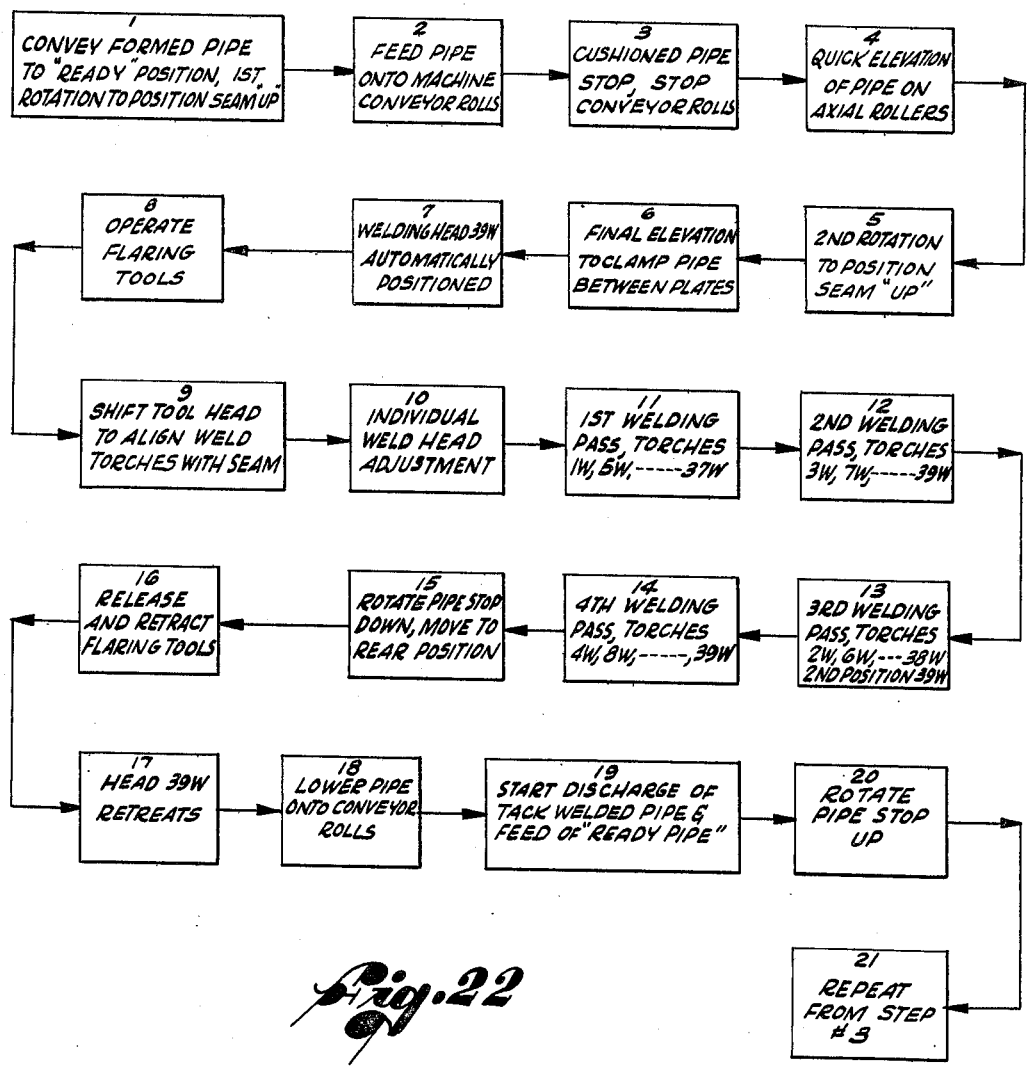

3,495,064
TACK-WELDING MACHINE
Ranoldo H. Grimoldi and Joseph E. Powers, Napa, Calif., assignors to Kaiser Steel Corporation, Oakland, Calif., a corporation of Nevada
Filed Mar. 25, 1966, Ser. No. 537,401
Int. Cl. B23k 9/02
U.S. Cl. 219—60    24 Claims

ABSTRACT OF THE DISCLOSURE

An improved machine for tack-welding the longitudinal seam edges of a pipe section preparatory to the final full seam welding of such edges wherein the machine includes means for longitudinally and circumferentially aligning the longitudinal edges of the pipe, clamping the pipe section in place and thereafter selectively tack-welding the fully aligned longitudinal edges of the clamped pipe section.

---

The present invention relates to a welding machine for tack welding the longitudinal edges of a die-formed pipe or tube preliminary to effecting a seam weld.

Machines for welding the seams of die-formed tubes into pipes of relatively large diameter and heavy gauge become very complex and expensive where the formed tube is directly clamped in the seam welding machine for the final seam welding operation. Because of this, it has been proposed in the past to tack weld the longitudinal edges of the tube preliminary to the seam welding operation, by hand welding. It will be seen, however, that such tack welding lacks uniformity, is time-consuming, and expensive in manpower. Also, some clamping and final alignment may be required to correct imperfect tubes so that even with a hand tacking operation some apparatus must be supplied.

In the machine according to the present invention, the die-formed tube is securely clamped in place, alignment corrected, and standard tack welds applied to the adjacent longitudinal edges at selected intervals along the length of the pipe, the number and length of the tack welds being determinable as desired. The entire tack-welding operation requires only one or two operators at control consoles to feed the die-formed tube into the machine, locate it properly both longitudinally and circumferentially, clamp the pipe rigidly against edge separation, correct final alignment of the pipe seam where necessary, locate the welding torches with respect to the pipe seam, and weld the tacks across the seam edges of the desired length and at desired intervals along the length of the pipe. The tack-welded pipe is then released and discharged from the machine with a new formed tube entering the machine immediately thereafter.

A formed pipe is fed into the machine from a "ready" position on conveyor rolls and is preferably stopped in a forward indexed position by engaging a cushioned stop. It is rotated to place the seam at its uppermost position and tightly clamped in the machine between clamping plates which prevent spreading of the edges. Since the length of the tube may vary from pipe to pipe, the position of the rear welding head is desirably made independently adjustable and provided with automatic sensing means for always locating the rearmost welding torch at the rear end of the pipe seam.

The tack-welded pipe is discharged from the machine according to the present invention to seam-welding machines to complete the pipe. These form no part of the present invention but by operating on tack-welded pipe instead of raw die-formed tubes the seam welders are much simpler in construction and less expensive. The importance of this saving is emphasized when it is considered that one tack welding machine according to the present invention will have an output of tack-welded pipe sufficient to supply a large number of seam-welding machines, for example of the order of ten to fifteen seam welders, depending on the gauge of the metal, the length of the pipe, the speed of welding, etc.

In welding pipe of the size and gauge here under consideration it may be found desirable to perform the seam weld in two operations. First, to partially weld the seam internally and then to finish weld the seam externally of the pipe. This division of the seam-welding operation cooperates well with the external tack welds supplied by the machine according to the present invention since the internal seam welding can be done without destroying the effectiveness of the tack welds in holding the seam edges together. When the external seam weld is made the internal weld holds the seam edges together while the tacks, which are relatively shallow in nature, are absorbed into the external seam weld. In one typical installation it has been found that one tack-welding machine according to the present invention can conveniently supply full capacity requirements of nine or more internal seam-welding machines and seven or more external seam-welding machines in producing completely welded pipe.

To secure such large output from the tack-welding machine of this invention it is desired that many of the tacks be made at the same time so that the complete tack-welding operation is expedited. Also, because the pipe is clamped between plates at close intervals it has been found desirable to have a weld torch for each tack weld to be made since otherwise the pipe clamps and the weld head mounting become complicated. In the specific exemplification shown in the drawings, which exemplification is to be taken as illustrative only and not limiting of the invention, thiry-nine welding heads and torches are provided for a standard forty foot length of pipe to effect a maximum of forty tack welds spaced substantially at one foot intervals along the length of the pipe. The thirty-ninth welding head is at the rear end of the machine and is independently controlled to locate a tack weld at the rear end of varying length pipes and then moves forwardly to effect a second tack-welding operation. It will be seen that tacks may be spaced at greater intervals by simply not energizing selected ones of the welding heads. For example, if every other welding head is energized the tacks will be spaced at two foot intervals along the pipe. Means are provided for readily varying the lengths of the tack welds themselves by adjusting the length of longitudinal travel of the welding heads and torches along the pipe seam.

Another feature of the tack-welding machine of this invention lies in sub-dividing the tack welds into groups which are made in separate passes in opposite directions longitudinally of the pipe, conveniently an even number of passes, so that the welding heads always end up in the same starting position. Specifically described herein are two and four pass operations for effecting twenty or forty tack welds in groups of ten.

The division of the tack welds into groups is desirable primarily from the standpoint of equipment cost, both at the machine itself and for the supply capacity which must be made available. If forty welding torches were energized at the same time a tremendous load would be placed on the electrical supply which would require a large service capacity to be made available, greatly in excess of normal requirements except during the period when the tack-welding machine was actually performing a welding operation. Likewise, the machine would need a power supply unit for each welding torch. To avoid this investment in supply units and service capacity, the welding torches are desirably connected in standard groups of four to one of ten power supply units which are in turn connected to the service supply. Only one of the welding torches connected to each power supply unit is energized at any one time so that the load on each unit is the power for but one welding torch and the total requirement on the service is for the welding power of ten welding torches. The number of power units selected is only a compromise, and five only can be utilized in making eight passes to effect forty welds, or twenty selected to make but two passes to make forty welds.

While the invention obviously is not limited to any particular size or gauge of pipe, one exemplification has been sized to receive pipe within the range of 18″ to 42″ in diameter and of any desired gauge of sheet or plate thickness from as thin as fourteen gauge to as thick as ½″. Obviously there is no limit to the size or gauge of the pipe for which the machine according to the present invention may be constructed except practical limits set by convenience and economics.

As a pipe to be tack welded is fed into the machine on the conveyor rolls thereof, it is desirably limited in its forward movement by a cushioned stop which absorbs its momentum and indexes the forward end of the pipe at the same position within the machine. The stop is mounted so as to be movable out of the way of the pipe which is discharged forwardly of the machine while a "ready" pipe is moving into the machine. The stop is repositioned immediately after the rear end of the tack-welded pipe passes thereby so that it will engage and position the forward end of the entering pipe.

The tack-welding machine of this invention may include flaring tools which may be projected into the pipe ends to correct any irregularity of alignment of the seam edges which may occur thereat. These tools are projected and retracted and apply bending pressure to the ends of the seam edges under optional controls at the operator's console.

While various features and objects of the present invention have been stated above, it will be understood that others are present in the constructions shown and described herein as will be apparent to those skilled in the art from the following specification and the appended drawings in which:

FIGURE 1 is a broken side elevational view of a tack-welding machine for pipe seams according to the present invention;

FIGURE 1a is a detailed view from within the oval arrows 1a of FIGURE 1;

FIGURE 1b is a detailed sectional view at the line 1b—1b of FIGURE 1a;

FIGURE 2 is a transverse vertical sectional view on the line 2—2 of FIGURE 1;

FIGURE 3 is a partial transverse sectional view on the line 3—3 of FIGURE 1;

FIGURE 4 is a partial view similar to FIGURE 3 showing the pipe stop rotated to an inoperative position;

FIGURE 5 is a longitudinal sectional view through the pipe stop taken on the line 5—5 of FIGURE 3;

FIGURE 6 is a plan view of the pipe stop as indicated by the arrow in FIGURE 5;

FIGURE 7 is a detailed view of a flaring tool positioned within a pipe end;

FIGURE 8 is a partial plan view showing the mounting for the flaring tool and taken at the arrow 8 in FIGURE 3;

FIGURE 9 is a diagrammatic view of the tool head indicating shifting and flexure thereof to align the welding torches with the pipe seam;

FIGURE 10 is a longitudinal vertical sectional view through the left end of the tool head as viewed in FIGURE 1, with a portion displaced downwardly;

FIGURE 11 is a detailed transverse sectional view on the lines 11—11 of FIGURE 10;

FIGURE 12 is a partial longitudinal vertical sectional view through the rear end of the tool head showing particularly the thirty-ninth weld head and the sensor for the rear end of the pipe;

FIGURE 13 is a detailed sectional view on the line 13—13 of FIGURE 12;

FIGURE 14 is a side elevational view of a wheeled rack with clamping plates thereon used in mounting different size clamping plates in the machine;

FIGURE 15 is an enlarged detailed sectional view at 15—15 on FIGURE 14;

FIGURE 16 is a partial transverse vertical sectional view showing a step in the mounting of an upper pipe clamping plate in the machine;

FIGURE 17 is a view similar to FIGURE 16 and showing the following step in the mounting of an upper clamping plate in the machine;

FIGURE 18 is a view similar to FIGURE 16 showing a step in the mounting of a lower pipe clamping plate in the machine;

FIGURE 19 is a view similar to FIGURES 16–18 with both upper and lower clamping plates mounted and the carrying rack removed;

FIGURE 20 is a schematic representation of the pneumatic and hydraulic operating elements of the machine;

FIGURE 21 is a diagrammatic representation of the energization of the various welding torches in the successive welding passes; and FIGURE 22 is a sequence diagram of the operational steps in effecting tack welding of a pipe seam in the machine of this invention.

Referring first to the overall showing of FIGURES 1–3, the machine is supported upon longitudinally extending, spaced apart, heavy base I-beams 25, 26 and 27 which may be anchored to the floor by embedded studs 28. The base I-beams may be connected to cross beams 29 by plates 31 welded to the respective beams and bolted together as shown. On the base beams 25 and 26 are supported vertical channel standards 32 on the side shown in FIGURE 1 and 33 on the opposite side. The channels 32 and 33 are spaced longitudinally along the machine and rigidly support adjacent their upper ends longitudinally extending plates 34 and 35, respectively, upon which are mounted the transverse, upper pipe-clamping plates. Suitable reinforcing gussets 36 at the top and 37 at the bottom srtengthen the connections of the channel standards 32, 33 to the clamp mounting plates and the supporting beams. Connections can be made in any desired manner, for example by welding the channel standards 32, 33 to the plates 34, 35, respectively, and by bolting the bottoms of the channels 32, 33 to the supporting beams 25, 26, respectively, as at 38.

Upon suitably spaced transverse beams 29 are bolted or otherwise secured conveyor supports 39 which are transversely spaced to rotatably mount adjacent their upper ends conveyor rolls 41 which are driven by conventional means, not shown, to move the pipe into and out of the machine. The machine conveyor rolls 41 are aligned with similar feed conveyor rolls from which a pipe in "ready" position is transferred to the machine conveyor rolls. The feed conveyor rolls preferably include conventional means for rotating the pipe about its longitudinal axis to rough position the pipe seam at the top. The feed conveyor forms no part of the present invention and has not been illustrated in the drawings.

Between the channel standards 32 and additional standards spaced to the right as viewed in FIGURE 2 but not shown in the drawing, is mounted a platform 42 providing a walkway for the operator or operators and access particularly to the welding heads and their positioning and controlling accessories.

A pair of control consoles 43 and 44 may be mounted at opposite ends of the machine on standards 45 carried in any desired manner, for example on brackets welded to an angle 46 supported on the platform 42. The consoles carry electric switching means manipulated by the operator or operators in the operation of the machine to effect the tack-welding operation. The consoles may be duplicates, particularly in the case of a single operator, or their functions may be separate in the case where two operators perform individual functions in the overall operation. The particular constructions of the individual consoles will be determined by the selection of the modes for carrying out the various operations, such as completely manual or partially manual and partially automatic sequence. These modes and the wiring setups therefor are easily within the scope of the skilled circuit engineer and their details form no part of the present invention. It will be understood that all of the operations to be described hereinafter may be effected entirely by manual control or with such automatic sensing control as is hereinafter explained. It is within the spirit of the invention that any portion of the various operations can be designed into sequence panel arrangements by known techniques readily within the skill of the electrical circuit designer.

THE ELEVATING MECHANISM

Rigid supporting plates 47 extend transversely of the machine between the vertical channel standards 32, 33 and supported on the plates 47 are hydraulic jacks 48, 48A comprising conventional cylinders 49 and pistons 51. At the upper ends of the pistons 51 are rigidly secured heads 52 on which are mounted transversely and longitudinally extending plates 53. To the opposite edges of plates 53 are welded or otherwise rigidly secured longitudinally extending brackets 54, each bracket 54 providing three longitudinally spaced notches 55 to receive and support lower pipe clamping plates 63. The brackets 54 at each side of the machine are rigidly interconnected by channels 56 connected thereto by welding or by bolts as shown in FIGURE 2 at 57. Symmetrically spaced longitudinally of the machine on the channels 56 are pairs of pipe rotating rollers 57 which extend above the lower pipe clamping plates 63 until the final clamping operation. The rollers 57 rotate the pipe for finally locating its seam in uppermost position. The rollers 57 are pneumatically supported by air cylinders and pistons 58 (FIGURE 20) mounted on cross plates and angles 59 extending transversely between the channels 56. Housings 61 are supported on and depend from the cross plates 59 to enclose the pneumatic supports 58 and also support driving mechanism for the rollers 57, including electric motors 62.

The lower clamping plates 63 are, in the specific embodiment illustrated, mounted in sets of three in the notches 55 in brackets 54 above each hydraulic jack 48, 48A, the jacks being spaced longitudinally of the machine to provide space therebetween for the conveyor rolls 41 and the pipe rotating rollers 57. When hydraulic fluid is supplied to the jacks 48, 48A their pistons 51 move upwardly to move therewith the piston heads 52, plates 53, brackets 44, channels 56, rollers 57, and clamping plates 63 as well as the workpiece pipe which, in the elevating operation, will be supported on the rollers 57 until the final clamping operation. The positions of these parts in the down position of the piston 51 is more clearly shown in FIGURE 2 with the circle 64 representing the workpiece pipe resting on the machine conveyor rolls 41.

To relieve the operator from the requirement of stopping the channels 56 and the pipe thereon in their initial elevation, a limit switch 164 controlling the solenoid valves for the jacks 48A may be mounted on a fixed standard 32 to be engaged by an actuator 165 adjustably mounted on the edge of a plate 166 secured to a channel 56 to move therewith (FIGURES 1, 1a, 1b). Adjustment of the position of the actuator 165 will determine the stopping point for the quick elevation of the pipe prior to its final rotation. A safety interlock switch 167 signals that the channels 56 are in their lowermost position by its operation by an actuator 168 which is independently adjustable on the edge of the plate 166.

THE UPPER CLAMPING PLATE MOUNTING

At substantially uniformly longitudinally spaced and transversely aligned positions along the plates 34, 35 are bearing holes 65 in which are rotatably mounted latch pins 66 held against axial movement by key plates 67. The inner ends of the latch pins 66 have semi-cylindrical notches 68 therein leaving semi-cylindrical latching tips 69 for the upper pipe clamping plates 71. Transversely aligned grooves 82 in the opposed inner faces of plates 34, 35 are offset from the centers of the holes 65 to be cleared by the latching tips 69 when their flat sides are vertical the side edges of the upper clamping plates 71 are received in the grooves 82 to be longitudinally indexed in the machine. Seats 72 are mounted in the grooves in the upper inner faces of the plates 34, 35 and the upper clamping plates 71 are provided with opposite notches 73 into which the latching tips 69 are rotated to lock the upper clamping plates 71 between the seats 72 and the flat surfaces of the latching tips.

Each latch pin 66 is rotated into latching and unlatching positions by means of a coil spring actuator 74 wrapped around its outer portion and having one end 75 received in a hole in a plate 76 rigidly secured to the end of the pin. The opposite end of each spring actuator 74 is received within an opening through an actuating bar 78 and held therein by a cotter pin or the like. There are two actuating bars 78, one for each side plate 34, 35 and they extend to the rear end of the machine where each is connected to one end of a pair of levers 79, the other ends of which are connected to the pistons of hydraulic actuators 81. The actuator 81 pistons thereby rotate the levers 79 to shift the bars 78 and, through the springs 74, effect rotation of the latch pins 66.

The latch pins 66 are shown in FIGURE 2 in latching position. When the bars 78 are moved toward the left as viewed in FIGURE 1, the pins 66 will be rotated sufficiently to clear the grooves 82 and the upper pipe clamping plates 71 will be released and free to move downwardly. The actuators 81 are so regulated that, in the position shown in FIGURE 1, they apply tension to all of the springs 74 in the direction to open their coils, thereby biasing the flat surfaces of the latching tips 69 against the upper end of the notches 73. This holds the clamping plates 71 against the seats 72 at all times and insures that they will be firmly seated against play and vibration when no pipe is being clamped thereagainst.

THE TOOL HEAD

Extending longitudinally of the machine of this invention is a box beam 83 which will be hereinafter referred to as the tool head. This tool head has a removable cover 84 and enclosed electrical supply units, controls and the like. The tool head 83 is supported on pier beams 85 by rollers 86 and 87 and is prevented from tipping by a lower roller 88. The beams 85 are located at least at the opposite ends of the tool head 83 and preferably at least at one intermediate position between the ends. The tool head 83 is connected to hydraulic actuators 89 so as to be shiftable transversely of the machine thereby. The beam forming the tool head 83 is subject to limited flexure so that the operation of intermediate actuators can bend the tool head to follow any camber of the pipe seam.

Mounted on the tool head 83 on upstanding brackets 91 is a cabinet 92 having openable doors 93 to provide access to coils of weld wire 94 positioned within the cabinet. Leading downwardly from the cabinet 92 are a plurality of flexible tubes or tubing 95, one for each welding head, through which the welding wires 96 are fed. In the specific embodiment selected for illustration in the drawing the welding heads and welding torches are thirty-nine in number and are designated 1W, 2W, 3W, . . . 39W.

FIGURE 9 illustrates diagrammatically the shifting and flexing of the tool head beam 83 and including the forward end shifting actuator 89 shown in more detail in FIGURE 2 and a similar rear end shifting actuator 89'. An intermediate hydraulic actuator for flexing the tool head beam to conform to a pipe seam camber is indicated at 89". It will be understood that the actuators 89, 89' and 89" are double-acting to shift their points of attachment in opposite directions.

The power supply units can be located exteriorly of the machine and wired thereto or can for purposes of convenience be mounted within the box beam forming the tool head 83 and accessible through the cover 84. While the electrical feed may, within the scope of certain aspects of the invention, be individual or sub-divided in any manner, in the selected embodiment the welding torches have been electrically divided into ten groups requiring ten power supply units and four welding passes to make the maximum number of tacking welds. The units within the tool head 83 may feed to any convenient exterior buss bar arrangement of which three are shown in FIGURE 2 at 97 mounted on insulating posts 98 and having the terminal ends of cables 99 connected thereto, the cables 99 leading to the individual welding heads and torches 1W–39W. With this arrangement, each of nine of the supply units will supply direct current to four welding torches, one at a time in the separate welding passes, and the tenth unit will supply three welding torches individually, torch 39W making two welds in two passes. The energization of the various welding torches in the welding passes is illustrated diagrammatically in FIGURE 21 and in the sequence diagram of FIGURE 22.

The welding heads and torches 1W–39W are conventional in nature including feeding means for the welding wires 96 passing therethrough into contact with the pipe at the seam. The wire feeding means of the welding heads are individually driven by individual motors 101, each of which is rigidly mounted with its associated welding head on a hanger bracket 102 pivotally suspended at 103 from an arm 104 rigidly mounted upon a longitudinally extending cart member 105.

The welding heads 1W–39W are individually transversely adjustable by means of knob nuts 226 which bear against abutment elements 227 mounted for limited swivelling movement in bearings 228 carried by plates 229 rigidly mounted on the hanger bracket 102. End threaded rods 230 are pivotally connected at 231 to the supporting arms 104 and extend freely through the abutment elements 227 to have the knob nuts 226 threaded therein. Rotation of a knob nut 226 thereby effects transverse swinging movement of the associated welding head hanger bracket 102 about its pivotal mounting 103 to move the welding torch tip transversely of the pipe seams.

On the front of the supporting arms 104 are mounted electrical control units 232. Rigidly secured on a fixed support 233 is an electrical cable duct 234 from which power and control cables 235 lead to the welding wire feed motors 101, to their magnetic brake control indicated generally at 236, and to the electrical control units 232.

The speed of the welding wire feeding motors 101 and the rate at which the welding wires 96 are fed may be controlled in any desired way but in the selected embodiment motors 101 are alternating current motors which are feed from a variable frequency alternating current supply. Adjustment of the supply frequency will control the speed of the motors and the rate of feed of the welding wire. These motors are also desirably equipped with conventional direct current magnetic brakes so that the motors 101 will not coast but will be positively braked to a stop. Since the details of this standard item form no part of the present invention the control therefor has been only generally indicated at 236 in FIGURE 2.

It is generally desirable to effect the tack welding operations in an inert atmosphere and means are provided for feeding an inert gas, such as argon or the like, adjacent to the welding torch tip. This includes a relatively rigid gas pipe 237 mounted on each welding head and having its lower end directed toward and terminating adjacent the tip of the welding torch from which the welding wire projects (FIGURE 1). A flexible tube 238 (FIGURE 2) connects the gas discharge tube 237 through a solenoid valve 239 and a manual shut-off valve 241 to a gas supply header pipe 242 which may be mounted on the tool head beam 83. An electrical control cable 242' connects the solenoid valve to the electrical control unit 232.

As indicated particularly in FIGURES 2, 10 and 12, the cart members 105 are of hollow box construction closed by rigid end plates 106. Nine of these cart members are identical and each support four of the welding heads. A tenth cart member 105' supports welding heads 37W, 38W and an eleventh cart member 105" supports the welding head 39W for independent movement. Each of the cart members has a pair of transverse axles 107 rigidly secured thereto. Flat supporting wheels 108 are rotatably mounted on one end of each transverse axle 107 and grooved supporting wheel 109 are rotatably mounted on the opposite ends. Rigidly secured to and depending from the tool head 83 are a pair of L-shaped brackets 111 and 112, at opposite sides of the tool head and with their horizontal legs providing trackways for the wheels 108 and 109. The trackway on the bracket 112 is wedge-shaped to receive, guide and index the grooved wheels 109.

Referring to FIGURE 10, the cart members 105 and 105' are interconnected by means of threaded pins 113 which pass through holes through the plates 106 and are secured to the plates by means of rounded nuts 114 which permit a limited amount of flexing between the adjacent cart members to facilitate their movement in the welding passes. The nuts 114 are locked by nuts 115 and the cart members 105 and 105' may be provided with suitable openings adjacent their ends to provide access to the interior nuts 114, 115. The forward cart member 105 is connected by a similar arrangement to a threaded pin 116 mounted in a coupling 117 connecting to a piston rod 118 of a double-acting piston 119 in a hydraulic actuator 120 which serves to shift the cart members in opposite directions during the welding passes. The connection between the tenth and eleventh cart members 105' and 105" will be explained in detail hereinafter.

THE PIPE STOP

A stop for the forward end of a pipe entering the tack-welding machine of this invention on the machine conveyor rolls 41 is shown in FIGURE 1 at 121 and in detail in FIGURES 3–6. A box-like supporting structure 122 has a top plate 123 on which the pipe stop mechanism is mounted. The pipe stop 121 comprises a head 124 having a hardened stop piece 125 replaceably mounted therein as by the studs shown in FIGURE 5. The head 124 is mounted on the rear end of a shaft 125' which is supported for both rotation and limited axial movement within stationary bearing sleeves 126 and 127 contained within supporting blocks 128 and 129, respectively, which are rigidly secured on a base 131 bolted to the top plate 123 at 132. A sleeve 133 with a bearing lining as shown in FIGURE 5 surrounds the shaft 125' between the blocks 129 and 128. The sleeve 133 has a key 134 thereon which enters a longitudinal slot 135 in the periphery of the shaft 125' to permit relative axial movement between the shaft and the sleeve while the key 134 prevents relative rotation therebetween.

An impact plate 136 is mounted on the forward end of the shaft 125' and the outer portion of the plate 136 engages the forward surface of the block 129 to limit the rearward movement of the pipe stop 121. The central portion of the impact plate 136 engages the head of the plunger 137 of a hydraulic dash pot 138 of conventional construction to absorb the momentum of the forwardly moving pipe and cushion its stop in its forwardmost indexed position. A limit switch 139 is positioned to be actuated by the impact plate 136 in its rearmost position, as indicated in dotted lines. The sleeve 133 has an arm 141 rigid therewith to which is pivotally secured the piston rod 142 of a pneumatic actuator 143 which serves to rotate the pipe stop 121 between its "up," pipe stopping position of FIGURE 3 and its "down," inoperative position of FIGURE 4 to permit a finished pipe to be moved forwardly out of the machine. A safety limit switch 144 is operated when the stop 121 is down to convey this intelligence. A pair of pneumatic actuators 145 are supported on opposite sides of the block 128. The piston rods of actuators 145 carry heads 146 which engage behind a forward abutment surface 147 on the stop head 124 to return the stop 121 to its rear position, as shown in dotted lines in FIGURE 6 and wherein it is indexed by the engagement of the impact plate 136 with the forward surface on the block 129.

While the rear end of a tack-welded pipe being discharged from the machine may be visually identified and a solenoid controlling the actuator 143 manually energized from the console 43 to rotate pipe stop 121 up to engage the entering pipe, this sensing and energization may, as indicated in FIGURE 5, also be done automatically through a photocell 140 as the rear end of a finished pipe passes thereby.

THE END FLARING TOOLS

The flaring tools for the ends of the pipe are shown more particularly in FIGURES 1, 3, 7 and 8 at 148. The tool comprises a head 149 which may have a face plate 151 of nonwelding material. The head 149 is mounted on the end of the piston rod 152 of a vertically mounted actuator 153 carried adjacent the end of an arm 154. The arm 154 is rigidly mounted on a vertical member 155 which is pivotally mounted in fixed brackets 156, and 157 supported on a box-like supporting column 158. Also rigidly secured to the vertical member 155 is an arm 159 to which is pivotally connected the piston rod 161 of a hydraulic actuator 162 mounted on the bracket 156. As illustrated in FIGURE 3, either or both the brackets 156 may be integral with a mounting plate 163 which thereby forms a unitary removable support for the entire mechanism of the flaring tool.

The use of the flaring tools 148 is optional depending on the condition of the seam at the ends of the pipe. If the edges of the pipe are mated at an end, no flaring need be done at that end. On the other hand, if either or both of the edges of the pipe should be bent inwardly as indicated in dotted lines in FIGURE 7, the flaring tools will be rotated by their actuators 162 to place them inside the pipe end beneath the seam as indicated in FIGURE 3 and the actuator 153 supplied with hydraulic fluid to move the head 149 upwardly and flare the ends of the pipe into mating position, as shown in the full-line, cross-hatched position of FIGURE 7.

THE WELD PASS CONTROL

Referring now to FIGURES 10, 11 and 12, the cart member actuator 120 also drives a control means for its own operation to reciprocate the cart members and the welding heads mounted thereon. For this purpose the double-acting piston 119 has a second piston rod 171 extending forwardly of the actuator 120 and having a threaded extension 172 mounted thereon. Upon the extension 172 are threaded a pair of independently rotatable switch actuating heads 173 and 174 held locked in adjusted position by thumb nuts 175. The switch actuating head 173 operates a plurality of independently adjustable limit switches 176, in the specific embodiment illustrated three in number, while the switch actuating head 174 operates the three independently adjustable limit switches 177. The actuating heads 173 and 174 reciprocate with the piston 119 and the cart members to actuate the switches in their opposite directions of movement. The switches 176 are mounted on plates 178 rigidly affixed so longitudinally spaced plates 179 and 181. The switches 177 are mounted on plates 182 rigid with longitudinally spaced plates 183, 184. The plates 179, 181, 183, 184 are supported by three pairs of adjusting screws 185 and 186 passing therethrough. The screws 185 pass freely through notches 187 in the plates 179, 181 and 184 and are threaded in complementary threaded holes through the plates 183 so that rotation of an adjusting screw 185 will effect longitudinal movement of only its associated switch 177. The adjusting screws 186 are threaded in complementary holes through the plates 179 and pass freely through notches 188 in the plates 181, 183 and 184 so that rotation of an adjusting screw 186 will effect longitudinal movement of only its associated switch 176. The longitudinal positions of the switches 176, 177 and the points in the movement of the cart members and welding heads at which they are actuated will therefore be independently adjustable by the adjusting screws 185, 186. Combined adjustment of the switch operating points in groups is effected by adjusting the positions of the switch actuators 173, 174 on the threaded extension 172.

AUTOMATIC LOCATION OF REAR WELDING HEAD

Referring now to FIGURES 12 and 13, there is illustrated therein the mechanism for sensing the rear end of the pipe and positioning the welding head 39W. The rear plate 106 on the cart member 105' has connected thereto a pin 191 by the usual rounded nuts 114. The pin 191 extends freely through an opening 192 in the plate 106 at the forward end of the cart member 105" and terminates within the cart member in a socket 193 in which is secured a lead screw 194. Upon the lead screw 194 is threaded a travelling nut 195 floating in a chamber within a housing 196 rigidly mounted on a rear end plate 197 on the cart member 105" so that the cart member, the housing 196 and the travelling nut 195 move longitudinally as a unit. A closed tube 198 rigidly mounted on the housing 196 encloses the end of the lead screw 194 as a protective housing. The travelling nut 195 has gear teeth on its external surface meshing with a driving worm gear 199. The worm gear 199 is carried by a shaft 201 in suitable bearings in the housing 196 and has a flexible coupling 202 to the drive shaft of an electric motor 203.

Depending from the cart member 105" are a pair of support members 204, 205 rigidly interconnected by a horizontal arm 206. The motor 203 is rigidly mounted on the member 204. A switch plate 207 is adjustably mounted by bolts and slots 208 on the horizontal arm 206. A first limit switch 209 is mounted on the switch plate 207 and a second limit switch 211 is adjustably mounted on the switch plate 207 by bolts and slots 212. The switch 209 may likewise be adjustably mounted by bolt and slot connections to the plate 207 if it is desired to adjust the position of switch 209 without moving the plate. The switches 209 and 211 are actuated by stationary switch actuators 213 and 214, respectively, mounted on fixed parts of the machine structure. The switch 211 can be utilized to limit the rearmost position of the cart member 105" and welding head 39W, while the switch 209 can be used to position the welding head 39W for a second welding operation during the fourth welding pass. Welding head 39W effects two welding operations in the four pass welding operation shown in FIGURE 21. In a two-pass, double-spaced operation, the welding head 39W makes only the weld at the end of the pipe.

At the bottom of the support member 205 is rigidly secured a horizontal tube 215 within which freely slides a plunger 216 having a pipe end engaging head 217 and biased forwardly by a spring 218 disposed about the plunger between the head 217 and a washer 219 engaging the forward end of the tube 215. The rearward end of the plunger 216 is threaded at 221 to adjustably mount a switch actuator 222 locked in adjusted position by a thumb nut 223. A limit switch 224, operated by the actuator 222 to control motor 203, is rigidly mounted on the support member 205 by a bracket 225.

OPERATION

The operation of the tack-welding machine according to the present invention will now be described with particular reference to the sequence diagram of FIGURE 22, the welding schematic diagram of FIGURE 21, and the pneumatic-hydraulic diagram of FIGURE 20, as well as the machine structure figures of the drawings.

The tube for the pipe is die-formed from flat sheet or plate into a cylinder of substantially standard length, for example, forty feet. The longitudinal edges of the sheet or plate are butted closely together to facilitate their being joined by a longitudinal seam weld. Depending on the seam-welding operation to be used and the particular apparatus therefor, the internal corners of the seam edges may be chamfered before forming to provide a guide grove for an interior welding tool. Such preliminary operations, as well as the final seam welding, form no part of the present invention which is directed to a tack-welding machine which joins the longitudinal edges of a pipe tube together by means of shallow tack welds spaced along the length of the pipe. The preliminary operations include feeding the formed pipe on conveyor rolls to a "ready" position at the rear end of the tack-welding machine. In this placing of a "ready" pipe it is preferably given an initial rotation by the conveyor to position the seam roughly in an "up" position.

As a tack-welded pipe is leaving the machine the "ready" pipe is fed into the machine onto the conveyor rolls 41 therein. These operations may be controlled by an operator from the consoles 43 and 44. Indeed, all of the operations of the welder can be manually controlled from the consoles within the broader aspects of certain features of the invention Alternatively, some operations may be selectively wired for sequence panel control in accordance with intelligence transmitted by the various switching components provided therefor. Such electrical hook-ups are optional and both manual and sequence control may be provided in the same machine with the operator selecting manual or automatic control for any portion of the machine at his option. Electrical connections for such controls are well within the skill of the circuit designing engineer and will be readily apparent to him from the sequence diagram and descriptions herein, the components provided in the structural figures, and the welding and hydraulic diagrams.

As the rear end of a tack-welded pipe leaves the machine of this invention, the pipe stop 121 is rotated up into its operative position of FIGURE 3. This operation occurs from energization of the solenoid controlling the actuator 143 and can be effected manually from a control console or by automatic sensing by the photocell 140. The incoming pipe then engages the stop 121 and is decelerated to a cushioned stop by the hydraulic dash pot 138. When the dash pot 138 is in maximum forward position, the conveyor rollers 41 are stopped and the forward end of the pipe is then indexed relative to the machine, with the stop 121 in the dotted line position of FIGURE 5.

The pipe is now moved upwardly while supported on the rollers 57 by supplying hydraulic fluid to selected ones of the jacks 48. All of the jacks 48 may be supplied with hydraulic fluid in this elevating operation but since their combined force is not needed and since the capacity of the high pressure fluid pump is limited, the initial elevation of the pipe is expedited by feeding high pressure hydraulic fluid only to the jacks 48A (FIGURE 20). The channels 56 and associated mechanism thereby quickly move upwardly, the pipe 64 being lifted off of the conveyor rolls 41 by the rollers 57. In this quick elevating movement the other jacks 48 of FIGURE 20 suck hydraulic fluid from the reservoir and do not require output from the hydraulic pump. This is an optional procedure but it provides a more rapid operation without requiring a large capacity high pressure pump.

The initial elevation of the pipe may be stopped manually at the console or automatically under the control of the limit switch 164 engaged by its actuator 165 (FIGURES 1, 1a, 1b). In this temporary upper position the motors 62 for the rollers 57 are manually jog-energized from the console to position the pipe seam in its uppermost position. Thereafter, hydraulic fluid at its maximum pressure is supplied to all of the jacks 48, 48A and the lower clamping plates 63 and the pipe 64 move to their final upper position with the pipe rigidly clamped between the lower clamping plates 63 and the upper clamping plates 71. In this final clamping movement the rollers 57 move downwardly against the bias of their pneumatic operators 58 with pressure automatically released from the valves shown in FIGURE 20. The pipe is now connected to one side of the welding current supply by conventional brushes or clamps, not shown.

The welding head 39W now automatically positions itself with respect to the rear end of the pipe, whose position in the machine varies with variation in the length of the pipe tube. The motor 203 is first energized manually or by automatic sequence and worm gear 199 rotates to rotate travelling nut 195 on the lead screw 194 and move the cart member 105" forwardly relative to the machine and the other cart members. This forward movement of the cart 105" moves the head 217 forwardly until it engages the end of the pipe and moves the plunger 216 rearwardly relative to the sleeve 215 sufficiently for the actuator 222 to operate the switch 224, whereupon the motor 203 is de-energized to position welding head and torch 39W with its welding wire in substantial alignment with the rear end of the pipe.

Alternatively, the motor 203 may be first energized to position welding torch 39W after the first welding pass. However, the first sequence is preferred to expedite the operation by having the 39W welding torch in position to weld at the end of the first welding pass, the 39W welding torch maintaining its indexed position during the first pass as explained hereinafter.

In the event that the pipe corners at either end are deformed inwardly, the flaring tools will now be swung into the pipe ends and operated to mate the edges of the pipe seams. This may be done by manual control at the consoles to feed hydraulic fluid to the actuators 162 at either or both ends of the machine to swing the flaring tools 148 into the pipe ends, as in the dotted line position of FIGURE 8. Actuators 153 are then supplied with hydraulic fluids to raise the heads 149 up a sufficient distance to move the pipe corners into alignment, as shown in FIGURE 7. This is again a manual jog operation to reach a cylindrical configuration.

On the other hand, if both ends of the pipe have the edges of the seam abutting in proper relation the flaring operation is omitted and the flaring tools remain in their retracted positions shown in full lines in FIGURES 3 and 8.

This completes the movements and adjustments on the pipe and the welding torches are now adjusted to align their welding wires with the pipe seam. Initial adjustment is effected by shifting the ends of the tool head beam 83 in the desired directions by selectively feeding hydraulic fluid to their double-acting actuators 89, 89'. This positions the end welding torches 1W, 39W in alignment with the ends of the pipe seam. If the pipe seam is a straight line this will also align the intermediate welding torches therewith.

Sometimes the pipe arrives in the machine with a camber to the seam and to correct for this one or more intermediate tool head beam flexing actuators 89" may be provided. Alternatively or in addition, correction may be made by individually adjusting the welding heads where necessary by manipulation of the knob nuts 226. In any event, whether by means of intermediate actuators 89″ to flex the tool head beam or by adjustment of individual weld heads or both, all the welding torches are aligned with the pipe seam. Tack welds joining the pipe edges are now made.

As previously described, to avoid investing in forty power supplies while still supplying sufficient power capacity for simultaneous welding of all the tacks, the welding torches are operated in groups of ten from ten power supply units. For minimum spacing between the tack welds, all of the welding torches will be operated in a four-pass operation, while with double-spacing between the tack welds only alternate torches will be operated in a double pass operation.

It will be understood that the lengths of the tack welds and the synchronizing of welding wire feed motors 101 with the shifting of the cart members 105 may be manually conducted at the console but are preferably set up for automatic control by adjusting both the positions of the switch actuating heads 173, 174 which move with the carts 105, and the positions of the relatively stationary switches 176, 177 which are operated thereby. The frequency of the alternating current supply to the welding wire feed motors 101 is adjusted to an initial desired value and may be continuously adjusted during the progress of the welds if desired.

The welding operations and the welding torches which are operating in each welding pass are illustrated in FIGURE 21 wherein full four-pass welding makes tack welds on substantially one foot centers, while the lower two passes alone will tack weld the seam on substantially two foot centers. The welding torches are given the same designation as in the structural figures of 1W–39W and the X connection of the vertical welding torch lines to the horizontal welding pass lines P1–P4 indicates the weld torches which are operating in a particular pass. The arrows beneath the welding torches 1W–39W show the directions in which each welding torch is moving while making a tack weld. In the first welding pass, welding torches 1W, 5W, 9W, . . . 37W have their welding wire feed motors 101 energized and make tack welds while the carts 105 and 105′ are controllably shifted rearwardly at a speed determined by the controlled feed of hydraulic fluid to the actuator 120 to move the piston 119 toward the rear.

The rates of feed of the welding wire and of speed of shifting of the welding torches will determine the thickness of the tack welds.

In the first rearward movement of the cart members 105 and 105′, cart member 105″ starts to move rearwardly therewith but the actuator 222 immediately closes switch 224 to energize motor 203 which rotates nut 195 to move the cart member 105″ forwardly relative to the cart 105′ whereby to maintain the welding torch 39W stationary at the pipe end regardless of the rearward movement of the cart member 105′. The speed of movement of the cart 105″ along the lead screw 194 is greater than the speed of rearward shifting of the carts 105, 105′ so that at the end of the first welding pass the welding torch 39W will still be properly positioned at the end of the pipe.

It will be understood that only those motors 101 are energized which are associated with the welding torches which are to make tack welds in a particular welding pass, and in the first welding pass it will be only those motors 101 which are associated with welding heads 1W, 5W, . . . 37W. The welding circuit is completed and a welding operation initiated when each welding wire makes contact with the pipe, the welding wires being connected to the side of the welding circuit opposite to the pipe connection. Also during the welding, only those solenoid valves 230 associated with the operating welding torches will be energized to supply an inert atmosphere about the welding arc.

When the desired length of tack has been welded, the feed of hydraulic fluid to the actuator 120, the energization of the welding wire feed motors 101, and the supply of inert gas are all terminated. The weld wires which have been performing the welds will burn back a known distance from the weld and will then extinguish the arc and the flow of welding current. This burn back is desired to prevent possible welding of the wire in the weld puddle and ends before the arc reaches the tip of the welding torch to which the wire might otherwise weld. Termination of the welding operation can be manually effected at the consoles or, in the embodiment illustrated, by operation of switches 177 by the actuator 174. Further, by adjusting the position of the switches 177 the de-energizations can be effected in a desired sequence for example, to first de-energize the motors 101, then de-energize the solenoid valves 239 and finally to de-energize the solenoid controlling the flow of hydraulic fluid to the actuator 120.

At the conclusion of the first welding pass the control of motor 203 is taken away from switch 224 by a manual operation at the console or by sequence control from a switch 177. Therefore, in the second welding pass the welding torch 39W will be moved forwardly in a welding operation as the cart member 105″ moves in unison with the cart member 105′, the nut 195 remaining fixed with respect to the lead screw 194.

The second welding pass P2 is now initiated manually or by a switch 177, and the welding torches X connected to the P2 line have their associated motors 101 energized to feed welding wire therethrough to effect welding during the pass. As can be seen from inspection of FIGURE 21 welding is here done by welding torches 3W, 7W, etc., including 39W which now effects a weld at the rear end of the pipe. As before, the solenoid valves 239 to the activated welding torches are energized and also the solenoid operating the valve initiating the feed of hydraulic fluid to the actuator 120 to move it forwardly, the feed being controlled to produce the welding rate desired.

When each welding wire feed motor 101 is de-energized it will be positively braked to a stop by the immediate energization of its internal magnetic brake through the unit 236. While this can be done manually, it is obvious to interlock the magnetic brake energization with the de-energization of the motor so that each time a motor is energized its magnetic brake is released and each time a motor is de-energized its magnetic brake is energized.

In the second welding pass the carts 105, 105′ and 105″ all move forwardly for the length of the tack desired as indicated by the directional arrows for welding beneath the welding torches 3W, 7W, 11 . . . 39W in FIGURE 21 and the pass is terminated either manually at the console or automatically by the switches 176, the cart members and welding heads stopping in their initial positions, except for cart member 105″ and welding head 39W.

For minimum tack weld spacing a third welding pass is now initiated either manually or from a switch 176. The operation is the same as previously described with energization of the welding wire feed motors 101 and solenoids 239 for welding torches 2W, 6W, 10W . . . 38W.

Motor 203 is now energized through a limit switch 209 either manually or by sequence control and during the third welding pass it controllably rotates the travelling nut 195 to move the cart 105″ forwardly both relatively with respect to the cart 105′ which is moving rearwardly, and absolutely with respect to the stationary machine. The absolute forward movement of the cart 105″ stops when the switch 209 engages and is operated by the fixed actuator 213. The movement relative to the cart 105′ continues with rearward movement of the cart 105′ until the termination of the third welding pass as described for termination of the first welding pass.

The fourth welding pass is now initiated with forward shifting of all of the carts 105, 105′ and 105″, the motor 203 remaining de-energized. In the fourth welding pass, the welding torches 4W, 8W, 12W . . . 39W make tack welds as described for the welding torches operating in the second welding pass.

The fourth welding pass is terminated either manually or by operation of a switch 176 and all tack welds are completed with the cart members 105, 105' and the weld heads 1W–38W returned to their initial forward positions.

At the completion of the fourth welding pass, motor 203 is energized for rotation in the reverse direction to move cart 105" back to its rearmost position, the motor 203 being de-energized and the cart member 105" stopping when the switch 211 engages and is operated by the stationary actuator 214. As the cart 105" moves forwardly after the first welding pass, sleeve 215 moves toward the head 217 on stationary plunger 216, but without effect. With the cart 105" in its rearmost position the plunger 216 and head 217 will be moved forwardly relative to the sleeve 215 by the spring 218. Operation of the switch 211 can also be utilized to place the switch 224 back in the circuit to motor 203 for operation to position the welding torch 39W at the end of a new pipe, as previously described. It will be further understood that rearward movement of the cart 105" need not be effected at this time but can be done at any time between the termination of the welding passes and the elevating of the next pipe into welding position.

At any time after the conveyor rollers 41 have been stopped, the solenoid controlling pneumatic pressure to the actuator 143 should be energized to rotate the pipe stop 121 down from its operative position of FIGURE 3 to the position of FIGURE 4. This can be done again manually or by sequence and if not done earlier should be effected at this time. Also, the solenoid controlling the pneumatic actuators 145 should be energized to move the pipe stop 121 back to its rearmost position, shown in dotted lines in FIGURE 6. When the pipe stop reaches its rearmost position the solenoid controlling pneumatic pressure to actuators 145 should be de-energized either manually or by operation of a limit switch operating reversely to that shown at 139 in FIGURE 6. The limit switch 139 will ordinarily be used to signal the full rearward position of the pipe stop 121 to indicate that the forward end of the pipe is indexed or to automatically stop the conveyor rolls 41.

If flaring tools 148 have been used, the solenoid controlling hydraulic pressure to the actuator 153 should now be de-energized and the solenoid controlling actuator 162 energized to move the piston therein to its retracted position to swing the arm 154 back to its inoperative position parallel to the axis of the machine, as shown in full lines in FIGURE 8.

The solenoids controlling hydraulic pressure to the jacks 48, 48A are now de-energized and the jacks retract to lower the channels 56 and lower clamping plates 63 into their lowermost positions of FIGURES 1 and 2 with the tack-welded pipe supported on the machine conveyor rolls 41. Both the conveyor rolls 41 and the feed conveyor rolls are now rotated to both discharge the tack-welded pipe from the machine and feed the "ready" pipe into the machine. When the rear end of the tack-welded pipe passes the stop 121, as visually identified or as sensed by the photocell 140, a solenoid controlling the actuator 143 is energized to retract the piston rod 142 and rotate the pipe stop 121 back up into its operative position (FIGURE 3) ready to engage the forward end of the pipe entering the machine. The operation is then repeated as previously described.

INSTALLING THE CLAMPING PLATES

There will now be described a mode of installing the clamping plates 63 and 71 within the tack-welding machine of this invention. These plates are of heavy gauge and large size, regardless of the diameter of the pipes which are being welded, and are heavy and cumbersome to manipulate, making their individual manual assembly and disassembly impractical. However, the machine of the present invention lends itself readily to a unique and relatively simple operation to replace both the upper and lower clamping plates when different size pipes are to be tack-welded in the machine. It will of course be understood that this is not a frequent replacement as ordinarily a considerable run will be made of any given size of pipe but when the size of the pipe to be manufactured does change it becomes necessary to change the clamping plates to place in the machine plates having a curvature at the clamping edge corresponding to the diameter of the pipe to be tack-welded in the machine.

There will first be explained the mode of assembling clamping plates within the machine initially or after previously used clamping plates have been removed, and with reference to FIGURES 14 through 19 of the drawing.

At opposite sides of the machine, within the vertical standards 32, are rails or tracks 251 mounted on supports 252 carried by the rigid supporting plates 47. The tracks 251 extend forwardly of the machine a sufficient distance to enable a plate-carrying rack 253, which must be as long as the clamping portion of the machine, to be moved into a forward position entirely out of the machine. The rack 253 in FIGURE 14 may be moved between this forward rail section and a storage position by a crane or the like. FIGURE 14 shows the rack 253 on the forward portion of the tracks 251 with both the upper clamping plates 71 and lower clamping plates 63 supported thereon. The rack 253 is constructed from opposite side channels 254 spaced apart to form a rigid structure by means of transverse channels 255. Eye lugs 256 may be mounted on the end cross channels 255 for attachment of pulling mechanisms to move the rack into and out of machine and to shift it a short distance within the machine as will be hereinafter described. The clamping plates 63 and 71 are mounted in the rack 253 with their opposite edges disposed in brackets 257 rigidly mounted on the inside walls of the channels 254, the brackets 257 being notched at 258 to receive the clamping plate edges. The rack 253 includes vertical supporting legs 259 rigidly secured to the opposite side channels 254 and having grooved wheels 261 rotatably mounted at their lower ends engaging wedge-shaped top portion 262 on the tracks 251 to index and guide the rack in its movements along the tracks. The brackets 257 supporting the upper clamping plates 71 on the rack 253 are located so as to position all the upper plates in the same relation to each other as they have when located in the machine. The brackets 257 which support the lower clamping plates 63 are likewise located so as to support the lower plates 63 in the same relation to each other as they have when located in the machine. However, the upper and lower clamping plates are offset from each other on the rack, as shown in FIGURE 14.

Referring now to FIGURE 16, the rack 253 has been rolled into its in-machine position with the upper clamping plates 71 positioned immediately below the grooves 82 in the upper side plates 34, 35. The solenoid controlling the supply of hydraulic fluid to the actuators 81 to move their piston rod outwardly has been energized and, through the pivoted levers 79, the latch bars 78 have been moved forwardly of the machine to rotate the latch pins 66 into their unlatching positions of FIGURE 16 with latching tips 69 positioned at the side of the grooves 82 to provide for passage of the clamping plates thereby.

To provide a desired spacing between the machine channels 56 and the rack side channels 254, blocks 263 are mounted on the upper surfaces of the channels 256 in position to engage complementary blocks 264 on the lower surfaces of the cross channels 255 of the rack when the rack is positioned to align the upper clamping plates 71 with the grooves 82, as shown in FIGURE 17. However, these blocks 263, 264 are short enough longitudinally so that they do not engage when the rack is positioned to align the lower clamping plates 63 with the notches 55 in the brackets 54, as shown in FIGURE 18.

With the rack positioned as in FIGURE 16, the solenoids controlling the jacks 48A are energized to direct hydraulic fluid thereto to elevate the channels 56. This energization is preferably manual by push-button switches at the consoles so as to be under the jog control of the operator. As the channels 56 move upwardly the blocks 263 engage the blocks 264 on the rack 253 and elevate the rack, with the edges of the upper clamping plates 71 entering and moving up in the grooves 82 in the upper side plates 34, 35. The upwardly moving parts stop in the position of FIGURE 17 with the clamping plates 71 engaging the seat bars 72. The energized solenoid controlling the actuators 81 is now de-energized and the opposite solenoid energized to retract the piston rods thereof and, through the levers 79 move the latching bars 78 toward the rear into the position of FIGURE 1. This rotates the latching pins 66 into the position of FIGURE 17, with the latching tips 69 disposed in the notches 73 with their flat surfaces substantailly transverse of the grooves 82, thereby latching the plates 71 in their upright operative positions in the side plates 34, 35. As previously explained, when the piston rods of the actuators 81 are retracted, the spring operators 74 interconnecting the latch bars 78 and the latch pins 66 are placed under tension so that the flat surfaces of the latching tips 69 are resiliently held against the upper surface defining the notch 73 so as to bias each clamping plate 71 against the seat bars 72 to prevent loose mounting of the plates.

From the position of FIGURE 17 the energization of the solenoid controlling the jacks 48A is changed to the opposite solenoid to retract the jacks and lower the channels 56 mounted thereon. This drops the rack 253 until the wheels 261 again engage the tracks 251, at which time the upper edges of the lower clamping plates 63 clear the lower edges of the upper clamping plates 71 which remain in their upper latched positions. The rack 253 is then shifted a short distance along the machine to vertically align the plates 63 and 71 which also places the opposite side edges of the plates 63 in alignment with the notches 55 in the brackets 54. At this time the elevating blocks 263, 264 are out of alignment so that they will clear each other. The parts are then in the same horizontal relation as in FIGURE 18 but with the jacks 48A retracted and the clamping plates 63 still mounted in their notches 258 in the brackets 257 on the rack 253. The jacks 48A are now elevated by manual energization of the proper controlling solenoid to the position of FIGURE 18. The lower portions of the lower clamping plates 63 enter the notches 55 in the brackets 54 in which they are to be supported in the machine, with their bottom edges engaging the plates 52.

In the position of FIGURE 18, the rack 253 clears all parts of the machine except for the rear elevating blocks 264 on the rack 253 which will interfere with the forward elevating blocks 263 on the channels 56. The rack 253 is rolled forward from the position of 253 until these elevating blocks come together. At this time the jacks 48A are lowered just sufficiently for the blocks to clear, the upper edges of the plates 63 moving slightly down within the rack side channels 254 and, there being no blocks 257 at this point, the rack can be moved forward sufficiently to clear the elevating blocks whereupon the jacks 48A are again elevated to the position of FIGURE 18 and the rack 253 withdrawn entirely from the machine onto the forward portion of the tracks 251, as in FIGURE 14, from where it can be removed to a storage position.

With the rack 253 entirely out of the machine, the jacks 48A are fully retracted to place the lower clamping plates in the position of FIGURE 19 which corresponds to the position of FIGURES 1 and 2 and the machine is ready to perform tack-welding operations on the seam of pipes of a size corresponding to the curvature of the clamping edges of the installed plates.

In replacing a set of clamping plates 63, 71 to accommodate a different size pipe in the machine, it will, of course, be necessary to first remove the plates then in the machine and the operations and movements of the cart 253 to effect removal of clamping plates already mounted in the machine is the exact reverse of that described for installing the clamping plates, the bottom plates 63 being first placed on the rack 253 by jack 48A manipulation, the rack shifted, the top plates placed on the rack by jack 48A and actuator 81 manipulation, and the rack moved forwardly out of the machine with the old clamping plates thereon. The old clamping plates are removed from the rack at the forward track position and stored for future use and the new clamping plates placed on the rack, whereupon the rack is run back into the machine and the new clamping plates installed as above described.

While certain preferred embodiments of the invention have been specifically illustrated and described, it will be understood that the invention is not limited thereto as many variations wlll be apparent to those skilled in the art and the invention is to be given its broadest interpretation within the terms of the following claims.

What is claimed is:

1. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe; transverse conveyor rolls within said machine for moving the pipe therein; lower clamping plates in said machine spaced longitudinally thereof and having their upper clamping edges substantially conforming to the transverse curvature of the pipe; means supporting said lower clamping plates for vertical movement to elevate the pipe and rigidly clamp it between said upper and lower plates, said last-mentioned means also being adapted to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates, said first-mentioned supporting means comprising a pair of elongated supporting plates mounted at opposite sides of the machine in an elevated position; and latch means on said plates engaging the opposite edges of said upper clamping plates to mount them on said supporting plates.

2. The tack-welding machine defined in claim 1 including: seats defining the upper limit of movement of said upper clamping plates; a latch-actuating bar for each of said supporting plates; resilient means interconnecting said latch-actuating bars and said latch means; and actuators for shifting said latch-actuating bars and for tensioning said resilient interconnecting means to bias the latching means against the upper clamping plates and the latter against said seats.

3. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe; transverse conveyor rolls within said machine for moving the pipe therein; lower clamping plates in said machine spaced longitudinally thereof and having their upper clamping edges substantially conforming to the transverse curvature of the pipe; means supporting said lower clamping plates for vertical movement to elevate the pipe and rigidly clamp it between said upper and lower plates, said last-mentioned means also being adapted to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates; pairs of transversely spaced rollers mounted for elevation with said lower clamping plates, said rollers having their axes of rotation parallel to the pipe axis, said pairs of rollers being spaced longitudinally of the machine and the rollers extending above the clamping edegs of said lower clamping plates so as to temporarily support the pipe on the rollers as they and the lower clamping plates are elevated to lift the pipe off of the conveyor rolls; and means for rotating said rollers to position the pipe seam in its upper most position, the mounting means for said rollers providing for movement thereof downwardly relative to the lower clamping plates as the pipe is rigidly clamped between the upper and lower plates.

4. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe; transverse conveyor rolls within said machine for moving the pipe therein; lower clamping plates in said machine spaced longitudinally thereof and having their upper clamping edge substantially conforming to the transverse curvature of the pipe; means supporting said lower clamping plates for vertical movement to elevate the pipe and rigidly clamp it between said upper and lower plates, said last-mentioned means also being adapted to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates, a tool head located above said upper clamping plates and extending longitudinally of the machine for substantially the full length thereof; means mounting said welding torches on said tool head for movement longitudinally of the machine; means for selectively shifting said tool head transversely to align said welding torches with the pipe seam; and said shifting means including actuators at the opposite ends of the tool head whereby the said ends may be independently shifted to align the end welding torches with the pipe seam.

5. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe; transverse conveyor rolls within said machine for moving the pipe therein; lower clamping plates in said machine spaced longitudinally thereof and having their upper clamping edges substantially conforming to the transverse curvature of the pipe; means supporting said lower clamping plates for vertical movement to elevate the pipe and rigidly clamp it between said upper and lower plates, said last-mentioned means also being adapted to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates; a tool head located above said upper clamping plates and extending longitudinally of the machine for substantially the full length thereof; means mounting said welding torches on staid tool head for movement longitudinally of the machine; means for selectively shifting said tool head transversely to align said welding torches with the pipe seam; and said shifting means including an intermediate actuator for shifting and flexing the tool head intermediate the ends thereof to conform intermediate welding torches to a camber in the pipe seam.

6. In a machine for tack welding the longitudinal edges of a pipe together preparatory to finally seam welding said edges to form a seam-welded pipe, supporting means extending longitudinally of the machine for substantially the length of a pipe to be tack-welded; a series of upper clamping plates mounted at preselected locations on said supporting means in longitudinally spaced relation to each other, said clamping plates having lower clamping edges substantially conforming to the transverse curvature of the pipe and adapted to extend across the longitudinal edges thereof; transverse conveyor rolls within said machine for moving the pipe therein; a series of lower clamping plates disposed in said machine in spaced relation to each other and longitudinally of said machine and having their upper clamping edges substantially conforming to the transverse curvature of the pipe; means supporting said lower clamping plates for vertical movement to elevate the pipe and rigidly clamp it between said upper and lower plates in order to effect abutting engagement between the said longitudinal edges of the pipe, said last-mentiond means also being adapted to lower the clamping edges of said lower clamping plates below the position occupied by said pipe when on said conveyor rolls; welding torches interposed between said upper clamping plates and above the longitudinal edges and the upper clamped portion of the pipe; means for moving said welding torches between the upper clamping plates and along the seam of a pipe clamped between said upper and lower plates to effect spaced tack welds across the seam of the pipe and with each of the tack welds being of a length less than the center to center spacing of a pair of upper clamping plates, a plurality of power supply units of a number which is substantially a submultiple of the number of welding torches and tack welds to be applied to the pipe seam; and means for supplying welding current to certain ones of said welding torches from said power supply units during movement of said torches in one direction along the pipe seam and to other ones of said torches during movement of said torches in an opposite direction along the pipe seam to effect spaced tack welds in a plurality of welding passes.

7. The tack-welding machine defined in claim 6 including: means for feeding welding current to alternate welding torches in welding torch movements in opposite directions along the pipe seam to effect tack welds on centers twice the distance between welding torches; and means for feeding welding current from said supply units to the intermediate welding torches during additional movements in opposite directions along the pipe seam to complete the tack welds on centers substantially the same as the spacing between the welding torches.

8. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe; transverse conveyor rolls within said machine for moving the pipe therein; lower clamping plates in said machine spaced longitudinally thereof and having their upper clamping edges substantially conforming to the transverse curvature of the pipe; means supporting said lower clamping plates for vertical movement to elevate the pipe and rigidly clamp it between said upper and lower plates, said last-mentioned means also being adapted to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates; means mounting the rear welding torch for movement independently of the other welding torches which are spaced at substantially equal intervals along the machine; means movable with said rear welding torch for sensing the end of a pipe clamped in the machine; and means controlled by said sensing means for positioning said rear welding torch adjacent the rear end of the pipe.

9. The tack-welding machine defined in claim 8 including: means for moving said rear welding torch independently of the sensing means forwardly of the rear end of the pipe to a second welding location.

10. The tack-welding machine defined in claim 9 in which the controlling and moving means for said rear welding torch provides for shifting movement thereof with the other welding torches by the means for moving said other welding torches while said rear welding torch is effecting its two tack welds.

11. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe, transverse conveyor rolls within said machine for moving the pipe therein; lower clamping plates in said machine spaced longitudinally thereof and having their upper clamping edges substantially conforming to the transverse curvature of the pipe; means supporting said lower clamping plates for vertical movement to elevate the pipe and rigidly clamp it between said upper and lower plates, said last-mentioned means also being adapted to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates; flaring tools at the opposite ends of the pipe; means for swinging said flaring tools into and out of the ends of the pipe and beneath the ends of the seam; and means for operating said flaring tools to force deformed corners at the ends of the pipe seam back into a desired cylindrical-configuration.

12. The tack-welding machine defined in claim 11 in which each of said flaring tools includes: an actuator for moving the tool between an inactive position clearing the pipe and a position beneath the pipe seam corners; and an actuator movable with the tool and forming a part thereof to elevate the tool to bend the pipe seam corners into the desired cylindrical configuration of the pipe.

13. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe; transverse conveyor rolls within said machine for moving the pipe therein; lower clamping plates in said machine spaced longitudinally thereof and having their upper clamping edges substantially conforming to the transverse curvature of the pipe; means supporting said lower clamping plates for vertical movement to elevate the pipe and rigidly clamp it between said upper and lower plates, said last-mentioned means also being adapted to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates; a support mounted above the level of said upper clamping plates; a longitudinal trackway mounted on said support; a plurality of cart members mounted on said trackway for shifting movements longitudinally of the machine; means connecting all but the rear cart member for movement as a unit; means connecting said rear cart member to the cart member immediately forward thereof for movement relative thereto; means mounting said welding torches on said cart members for limited shifting movement therewith longitudinally of the machine to effect spaced tack welds across the pipe seam; and means for controllably shifting said cart members at a speed in accordance with the desired welding rate.

14. The tack-welding machine defined in claim 13 including: means for sensing the rear end of a pipe in the machine; and means controlled by said sensing means for effecting independent positioning of said rear cart member with said rear welding torch substantially at said rear pipe end.

15. The tack-welding machine defined in claim 13 including: means for moving said rear cart member independently of the other cart members to two welding positions, one at the rear end of the pipe and a second spaced forwardly thereof, said last-mentioned means providing for movement of said rear cart member and the welding torch thereof in unison with the other cart members when the rear welding torch is effecting its welding operations.

16. The tack-welding machine defined in claim 15 in which said means for independently moving said rear cart member and welding torch includes: means for sensing the end of a pipe clamped in the machine and locating the rear welding torch thereat for one of its welding operations; and means for indexing said rear welding torch at a standard position in the machine for a second welding operation.

17. The tack-welding machine defined in claim 16 including: means for energizing each of said welding torches to make but a single tack weld on each pipe, said energizing means for energizing said welding torches in groups; and means for shifting said welding torches in multiple welding passes while different torches are energized to effect tack welds spaced along the pipe seam.

18. In a machine for tack-welding the longitudinal edges of a pipe together preparatory to finally seam-welding said edges to form a seam-welded pipe, supporting means extending longitudinally of the machine for substantially the length of a pipe to be tack-welded, a series of upper clamping plates mounted at preselected locations on said supporting means in longitudinally spaced relation to each other, said clamping plates having lower clamping edges substantially conforming to the transverse curvature of the pipe and adapted to extend across the longitudinal edges thereof; transverse conveyor rolls within said machine for moving the pipe therein; a series of lower clamping plates disposed in said machine in spaced relation to each other and longitudinally of said machine and having their upper clamping edges substantially conforming to the transverse curvature of the pipe; means supporting said lower clamping plates for vertical movement to elevate the pipe and rigidly clamp it between said upper and lower plates in order to effect abutting engagement between the said longitudinal edges of the pipe, said last-mentioned means also being adapted to lower the clamping edges of said lower clamping plates below the position occupied by said pipe when on said conveyor rolls, welding torches interposed between said upper clamping plates and above the longitudinal pipe edges and the upper clamped portion of the pipe; means for moving said welding torches between said upper clamping plates and along the seam of a pipe clamped between said upper and lower plates to effect spaced tack welds across the seam of the pipe and with each of the tack welds being of a length less than the center to center spacing of a pair of upper clamping plates, a stop adjacent the forward end of the machine to be engaged by a pipe entering the machine to index the front end of the pipe at a predetermined location in the machine; and means for moving said stop from its operative position to its inoperative position so as to clear the path for a tack-welded pipe for discharge forwardly of the machine.

19. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe; transverse conveyor rolls within said machine for moving the pipe therein; lower clamping plates in said machine spaced longitudinally thereof and having their upper clamping edges substantially conforming to the transverse curvature of the pipe; means supporting said lower clamping plates for vertical movement to elevate the pipe and rigidly clamp it between said upper and lower plates, said last-mentioned means also being adapated to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates, a stop adjacent the forward end of the machine to be engaged by a pipe entering the machine to index the front end of the pipe at a predetermined location in the machine; means for moving said stop between its operative and an inoperative position to clear the path of a tack-welded pipe for discharge forwardly of the machine; and means sensing the rear end of a tack-welded pipe being discharged to return said stop automatically to its operative position to be engaged by an incoming pipe following said pipe being discharged.

20. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe; transverse conveyor rolls within said machine for moving the pipe therein; lower clamping plates in said machine spaced longitudinally thereof and having their upper clamping edges substantially conforming to the transverse curvature of the pipe; means supporting said lower clamping plates for vertical movement to elevate the pipe and rigidly clamp it between said upper and lower plates, said last-mentioned means also being adapted to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates, a stop adjacent the forward end of the machine to be engaged by a pipe entering the machine to index the front end of the pipe at a predetermined location in the machine; means for moving said stop between its operative and an inoperative position to clear the path of a tack-welded pipe for discharge forwardly of the machine; means supporting said stop for limited movement forwardly of the machine when engaged by a forward moving pipe entering the machine and means for opposing said forward movement of said stop to absorb the momentum of the moving pipe to bring it to a cushioned and indexed stop.

21. The tack-welding machine defined in claim 20 in which said momentum absorbing means resisting forward movement of the stop is a hydraulic dash pot; and means for returning said stop to its rearmost position after said pipe and stop have been moved relatively out of alignment.

22. In a tack-welding machine for seam-welded pipe, supporting means extending longitudinally of the machine for substantially the length of a pipe to be tack-welded; upper clamping plates mounted on said supporting means at locations spaced therealong, said clamping plates having lower clamping edges substantially conforming to the transverse curvature of the pipe; transverse conveyor rolls within said machine for moving the pipe therein; lower clamping plates in said machine spaced longitudinally thereof and having their upper clamping edges substantially conforming to the transverse curvature of the pipe; means supporting said lower clamping plates for vertical movement to elevate the pipe and rigidly clamp it between said upper and lower plates, said last-mentioned means also being adapted to lower the clamping edges of said lower clamping plates below the position occupied by said pipe when on said conveyor rolls; welding torches mounted between said upper clamping plates and above the upper clamped position of the pipe; means for moving said welding torches along the seam of a pipe clamped between said upper and lower plates to effect spaced tack welds across the seam of the pipe and with each of the tack welds being of a length less than the center to center spacing of said upper clamping plates; rails mounted adjacent the opposite sides of the machine; a rack movable on said rails into and out of said machine; and means on said rack for supporting both said upper and lower clamping plates thereon and with the arrangement of the plates in both the upper and lower sets of plates being in substantially the same relation within their respective sets as they occupy in the machine whereby manipulation of the rack will effect assembly and disassembly operations of the clamping plates in a set in unison.

23. The tack-welding machine defined in claim 22 in which said sets of upper and lower plates are mounted with the sets offset within the rack while the plates in each set have the same relation to each other as they do when mounted in the machine whereby said sets may be individually transferred between the rack and their mounting in the machine without interference by shifting of the rack after assembly or disassembly of one of the sets; and means on the means for elevating said lower clamping plates for lifting said rack off of its supporting rails to effect transfer of the sets of plates between the rack and the machine.

24. In a machine for tack welding the longitudinal edges of a pipe together preparatory to finally seam welding said edges to form a seam welded pipe, supporting means extending longitudinally of the machine for substantially the length of a pipe to be tack welded; a series of upper clamping plates mounted at preselected locations on said supporting means in longitudinally spaced relation to each other, said clamping plates having lower clamping edges substantially conforming to the transverse curvature of the pipe and adapted to extend across the longitudinal edges thereof; transverse conveyor rolls within said machine for moving the pipe therein; a series of lower clamping plates disposed in said machine in spaced relation to each other and longitudinally of said machine and having their upper clamping edges substantially conforming to the transverse curvature of the pipe; means supporting said lower clamping plates for vertical movement to elevate the pipe and rigidly clamp it between said upper and lower plates in order to effect abutting engagement between the said longitudinal edges of said pipe, said last mentioned means also being adapted to lower the clamping edges of said lower clamping plates below the position occupied by said pipe when on said conveyor rolls; welding torches interposed between said upper and clamping plates and above the longitudinal pipe edges and the upper clamped portion of the pipe; means for moving said welding torches between said upper clamping plates and along the seam of a pipe clamped between said upper and lower plates to effect spaced tack welds across the seam of the pipe and with each of the tack welds being of a length less than the center to center spacing of a pair of said upper clamping plates; and means for supplying welding current to selected ones of said welding torches in groups as the torches move in opposite directions across the pipe seam to effect spaced tack welds in separate welding passes; means for reciprocating said welding torches as a unit; torch actuating means movable with said welding torches; and control means adjustably mounted on said first mentioned and longitudinally extending supporting means and adapted to be egaged by said actuating means to control the welding operations and the length of the tack welds.

References Cited

UNITED STATES PATENTS

| | | |
|---|---|---|
| 1,740,117 | 12/1929 | Pickney. |
| 1,872,793 | 8/1932 | Nilson et al. _____ 219—65 |
| 2,061,671 | 11/1936 | Riemenschneider. |
| 2,550,641 | 4/1951 | Harter. |
| 2,623,973 | 12/1952 | Malke. |
| 3,288,978 | 11/1966 | Trygar _____ 219—161 X |
| 3,019,328 | 1/1962 | Brashear et al. _____ 219—125 |

JOSEPH V. TRUHE, Primary Examiner

B. A. STEIN, Assistant Examiner